(12) United States Patent
Motomitsu et al.

(10) Patent No.: US 11,312,187 B2
(45) Date of Patent: Apr. 26, 2022

(54) HEAVY-DUTY PNEUMATIC TIRE

(71) Applicant: The Yokohama Rubber Co., LTD., Tokyo (JP)

(72) Inventors: Takamasa Motomitsu, Hiratsuka (JP); Yukihito Yamaguchi, Hiratsuka (JP)

(73) Assignee: The Yokohama Rubber Co., LTD.

( * ) Notice: Subject to any disclaimer, the term of this patent is extended or adjusted under 35 U.S.C. 154(b) by 565 days.

(21) Appl. No.: 16/090,158

(22) PCT Filed: Mar. 28, 2017

(86) PCT No.: PCT/JP2017/012665
§ 371 (c)(1),
(2) Date: Sep. 28, 2018

(87) PCT Pub. No.: WO2017/170562
PCT Pub. Date: Oct. 5, 2017

(65) Prior Publication Data
US 2019/0111737 A1 Apr. 18, 2019

(30) Foreign Application Priority Data

Mar. 31, 2016 (JP) .............................. JP2016-072149
Mar. 31, 2016 (JP) .............................. JP2016-072182

(51) Int. Cl.
*B60C 11/11* (2006.01)
*B60C 11/12* (2006.01)
(Continued)

(52) U.S. Cl.
CPC ........... *B60C 11/13* (2013.01); *B60C 11/0311* (2013.01); *B60C 11/0327* (2013.01);
(Continued)

(58) Field of Classification Search
CPC ............. B60C 11/0311; B60C 11/0316; B60C 2200/065; B60C 2200/08; B60C 2200/14
See application file for complete search history.

(56) References Cited

U.S. PATENT DOCUMENTS 4,217,942 A 8/1980 Takigawa et al.
2001/0054463 A1 12/2001 Matsuura et al.
(Continued)

FOREIGN PATENT DOCUMENTS

CN 102695620 9/2012
CN 104129236 11/2014
(Continued)

OTHER PUBLICATIONS

Machine Translation: JP-2008279976-A,Kawai, Toshiyuki, (Year: 2020).*

(Continued)

*Primary Examiner* — Kendra Ly
(74) *Attorney, Agent, or Firm* — Thorpe North & Western

(57) ABSTRACT

A tread pattern of a heavy duty pneumatic tire includes: a linear shaped center lug groove; a pair of circumferential main grooves formed in a wave shape in a tire circumferential direction; a center block; and a central narrow groove that does not have a linear shape, having an opening end that opens in the adjacent center lug grooves in a tire lateral direction position excluding on a tire equator line, and having a groove width that is narrower than the groove width of the shoulder lug groove. The groove width of the center lug groove and the circumferential main groove is narrower than the groove width of the shoulder lug groove. The central narrow groove has a portion that extends outwards in a tire lateral direction from the opening end in the half tread region where the opening end is positioned.

15 Claims, 13 Drawing Sheets

(51) Int. Cl.
  *B60C 11/13* (2006.01)
  *B60C 11/03* (2006.01)
(52) U.S. Cl.
  CPC . *B60C 2011/036* (2013.01); *B60C 2011/0346* (2013.01); *B60C 2011/0348* (2013.01); *B60C 2011/0351* (2013.01); *B60C 2011/0353* (2013.01); *B60C 2011/0355* (2013.01); *B60C 2011/0381* (2013.01); *B60C 2200/065* (2013.01)

(56) References Cited

U.S. PATENT DOCUMENTS

| | | | |
|---|---|---|---|
| 2004/0211502 A1* | 10/2004 | Ono | B60C 11/11 152/209.19 |
| 2007/0199633 A1* | 8/2007 | Hayashi | B60C 11/0311 152/209.18 |
| 2013/0180638 A1 | 7/2013 | Washizuka | |
| 2015/0107741 A1* | 4/2015 | Hasegawa | B60C 11/0311 152/209.25 |
| 2015/0352906 A1 | 12/2015 | Nomura | |
| 2017/0210180 A1 | 7/2017 | Sato et al. | |

FOREIGN PATENT DOCUMENTS

| | | | | |
|---|---|---|---|---|
| CN | 104981363 | | 10/2015 | |
| EP | 2 614 966 | | 7/2013 | |
| JP | H09-058220 | | 3/1997 | |
| JP | 11034615 | A * | 2/1999 | |
| JP | 11222009 | A * | 8/1999 | B60C 11/033 |
| JP | 2000-177326 | | 6/2000 | |
| JP | 2000177328 | A * | 6/2000 | B60C 11/0311 |
| JP | 2004075056 | A * | 3/2004 | |
| JP | 2004-203268 | | 7/2004 | |
| JP | 2004262295 | A * | 9/2004 | B60C 11/0311 |
| JP | 2008114738 | A * | 5/2008 | B60C 11/01 |
| JP | 2008-279976 | | 11/2008 | |
| JP | 2008279976 | A * | 11/2008 | B60C 11/0311 |
| JP | 2010125999 | A * | 6/2010 | |
| JP | 4676959 | | 4/2011 | |
| WO | WO 02/100664 | | 12/2002 | |
| WO | WO 2006/001202 | | 1/2006 | |
| WO | WO 2011/080565 | | 7/2011 | |
| WO | WO 2014/119325 | | 8/2014 | |
| WO | WO 2016/013604 | | 1/2016 | |

OTHER PUBLICATIONS

Machine Translation: JP-11034615-A; Aoki, Yasutoshi; (Year: 2021).*
Machine Translation: JP-2000177328-A; Aoki, Namihito; (Year: 2021).*
Machine Translation: JP-2004262295-A; Ono, Akira; (Year: 2021).*
Machine Translation: JP-11222009-A; Nomura, Tsutomu; (Year: 2021).*
Machine Translation: JP-2004075056-A, Kobayashi, Kazutomi, (Year: 2021).*
Machine Translation: JP-2010125999-A, Takada, Motohiro, (Year: 2021).*
Machine Translation: JP-2008114738-A, Yoda, Hidetoshi, (Year: 2021).*
International Search Report for International Application No. PCT/JP2017/012665 dated Jun. 6, 2017, 4 pages, Japan.

* cited by examiner

HEAVY-DUTY PNEUMATIC TIRE

TECHNICAL FIELD

The present technology relates to a heavy duty pneumatic tire with a tread pattern.

BACKGROUND ART

A heavy duty tire mounted to a heavy duty vehicle such as a dump truck or the like has high braking and acceleration frequency, and also has high sharp turning frequency, and therefore, in particular, when traveling off-road in a mine or the like, tread rubber tends to wear unevenly. Therefore, high uneven wear resistance is required in a heavy duty tire. On the other hand, a heavy duty tire with a plurality of blocks formed on a tread surface easily builds up heat due to the blocks repeatedly deforming during travel, and in particular, when traveling a long distance off-road, peeling referred to as heat separation is prone to occur between the tread rubber and a belt layer inside a tread portion, due to the block heat build-up. Therefore, high heat build-up resistance is required in a heavy duty tire.

An example of a conventional heavy duty tire formed by a plurality of blocks on a tread surface includes a tire described in Japanese Patent No. 4676959. A heavy duty tire in Japanese Patent No. 4676959 specifically has a center block row demarcated by a circumferential narrow groove formed along a tire circumferential direction and a width direction narrow groove formed along a tire lateral direction, and a shoulder block row demarcated by a circumferential direction narrow groove and a main lug groove. A tread gauge in a tread center region is 95 mm or greater, a main lug groove depth is 70 to 80% of the treat gauge, a negative rate in ground contact width is 15 to 30%, and the number of center blocks or shoulder blocks is 32 to 44. The center block provides one or more subsidiary narrow grooves having a length that is 100 to 180% of a circumferential direction length of the center block.

According to the heavy duty tire, heat build-up resistance is improved, and therefore, the tire can be preferably used as a heavy duty tire for a construction vehicle. Furthermore, according to the heavy duty tire, one or more subsidiary grooves with a length that is 100 to 180% of a circumferential direction length of the center block is provided, and therefore, a cooling effect of a crown portion can be enhanced, and cut separation resistance can be improved.

However, with the tire in Japanese Patent No. 4676959, both heat build-up resistance and uneven wear resistance cannot be achieved. Herein, achieving both refers to improving both properties.

SUMMARY

The present technology provides a heavy duty pneumatic tire that can achieve both heat build-up resistance and uneven wear resistance.

One aspect of the present technology is a heavy duty pneumatic tire with a tread pattern. The tread pattern of the heavy duty pneumatic tire includes:

a plurality of center lug grooves with a linear shape, provided at intervals in a tire circumferential direction, each having both ends, and each extending in an inclined direction with respect to a tire lateral direction and tire circumferential direction, in half tread regions that are on a first side and a second side of a tire equator line in a tire lateral direction so as to cross the tire equator line;

a plurality of shoulder lug grooves provided at intervals in a tire circumferential direction in the half tread regions, extending outward in a tire lateral direction, and opening to a ground contact end that is on either side in a tire lateral direction, positions in the tire lateral direction of inward ends of the shoulder lug grooves being further outward than positions in the tire lateral direction of ends of the center lug grooves, and one of the shoulder lug grooves being provided between adjacent center lug grooves adjacent in a tire circumferential direction of the center lug grooves in a tire circumferential direction;

a pair of circumferential main grooves provided in the half tread regions, each formed in a wave shape over an entire region along the tire circumferential direction, each including a first groove turning portion curved or bent to form a convex shape outward in the tire lateral direction, and a second groove turning portion curved or bent to form a convex shape inward in the tire lateral direction, such that each of the circumferential main grooves alternately connects one of the ends of the center lug grooves and one of the inward ends of the shoulder lug grooves;

a plurality of center blocks formed in a row in the tire circumferential direction, each demarcated by the adjacent center lug grooves and the pair of circumferential main grooves; and a central narrow groove having a non-linear shape, extending in a region of one of the center blocks, and having opening ends that open at the adjacent center lug grooves at positions in the tire lateral direction away from the tire equator line, and having a groove width narrower than a groove width of the shoulder lug grooves.

A groove width of the center lug grooves and a groove width of the circumferential main grooves are narrower than the groove width of the shoulder lug grooves, and the central narrow groove has portions each extending outward in the tire lateral direction from one of the opening ends, in one of the half tread regions where the one of the opening ends is positioned.

A ratio L1/L2 is preferably 1.8 to 2.2, in which a length of the central narrow groove is L1, and a tire circumferential direction length of each of the center blocks is L2.

The central narrow groove preferably has two turning out portion, each extending so as to protrude outward in the tire lateral direction with respect to the tire equator line in each of the half tread regions.

Lb is preferably longer than La, in which a length of a portion of the central narrow groove extending from one of the opening ends to an apex portion of one of the turning out portion is La, and a length of a portion of the central narrow groove extending between apex portions of turning out portion is Lb.

The tread pattern preferably further includes: a plurality of shoulder blocks formed in a row in a tire circumferential direction, each demarcated by an end in a tire lateral direction of the tread portion on which the tread pattern is formed, the circumferential main groove, and a pair of adjacent shoulder lug grooves adjacent in the tire circumferential direction of the shoulder lug grooves, in each of the half tread regions; and shoulder narrow grooves each extending in a region of one of the shoulder blocks, opening to the adjacent shoulder lug grooves, and having a groove width that is narrower than the groove width of the shoulder lug grooves.

A ratio L3/L4 is preferably 1.0 to 1.4, in which a length of each of the shoulder narrow grooves is L3, and a minimum length in a tire circumferential direction of the shoulder blocks is L4.

Another aspect of the present technology is also a heavy duty pneumatic tire with a tread pattern. The tread pattern of the heavy duty pneumatic tire includes: a plurality of center lug grooves with a linear shape, provided at intervals in a tire circumferential direction, each having both ends, and each extending in an inclined direction with respect to a tire lateral direction and tire circumferential direction, in half tread regions on a first side and second side of a tire equator line in a tire lateral direction so as to cross the tire equator line;

a plurality of shoulder lug grooves provided at intervals in a tire circumferential direction in the half tread regions, extending outward in a tire lateral direction, and opening to a ground contact end that is on either side in a tire lateral direction, positions in a tire lateral direction of inward ends of the shoulder lug grooves being further outward than positions in the tire lateral direction of ends of the center lug groove, and one shoulder lug groove being provided between adjacent center lug grooves adjacent in a tire circumferential direction of the center lug grooves in a tire circumferential direction;

a pair of circumferential main grooves provided in the half tread region, each formed in a wave shape on an entire region along the tire circumferential direction, each including a first groove turning portion curved or bent to form a convex shape outward in the tire lateral direction, and a second groove turning portion curved or bent to form a convex shape inward in the tire lateral direction, such that each of the circumferential main grooves alternately connects one of the ends of the center lug grooves and one of the inward ends of the shoulder lug grooves;

a plurality of center blocks formed in a row in the tire circumferential direction, each demarcated by the adjacent center lug grooves and the pair of circumferential main grooves;

one or a plurality of first central narrow grooves each extending in a region of one of the center blocks, each having a first end that opens in one of the circumferential main grooves or one of the center lug grooves, and a second end closed in the region of the one of the center blocks, and having a groove width narrower than a groove width of the shoulder lug grooves; and a second central narrow groove extending in the region of the one of the center blocks, opening to the adjacent center lug grooves, and having a groove width narrower than the groove width of the shoulder lug grooves.

A groove width of the center lug grooves and a groove width of the circumferential main grooves are narrower than the groove width of the shoulder lug grooves.

A ratio L11/L12 is preferably 0.4 to 0.9, in which a tire circumferential direction length of each of the center block is L11, and a groove length of the first central narrow grooves is L12.

The tread pattern preferably includes:

an N number of the first central narrow grooves as the plurality of the first central narrow grooves, the first central narrow grooves having a groove length L12, wherein a ratio L11/(N×L12) is 0.8 to 3.0, in which a tire circumferential direction length of each of the center blocks is L11.

A ratio L13/L11 is preferably 1.8 to 2.2, in which a tire circumferential direction length of each of the center blocks is L11, and a groove length of the second central narrow groove is L13.

The second central narrow groove preferably has one turning out portion extending so as to protrude outward in the tire lateral direction with respect to the tire equator line in each of the half tread regions.

A ratio of Dm with regard to the shorter of the L11 and Bd is preferably 0.1 or higher, in which a shortest distance between one of the first central narrow grooves and the second central narrow groove in one of the center blocks is Dm, a tire circumferential direction length of one of the center blocks is L11, and a length of a tire lateral direction region occupied by at least one region of the center blocks and the center lug grooves over a tire circumferential direction is Bd.

The tread pattern preferably further includes: a plurality of shoulder blocks formed in a row in a tire circumferential direction, each demarcated by an end in a tire lateral direction of the tread portion, the circumferential main groove, and a pair of adjacent shoulder lug grooves adjacent in the tire circumferential direction of the shoulder lug grooves, in each of the half tread regions; and shoulder narrow grooves each extending in a region of one of the shoulder blocks, opening to the adjacent shoulder lug grooves, and having a groove width that is narrower than the groove width of the shoulder lug grooves.

A ratio L14/L15 is preferably 1.0 to 1.2, in which a length of each of the shoulder narrow grooves is L14, and a minimum length in a tire circumferential direction of the shoulder blocks is L15.

A maximum groove depth of the circumferential main grooves is preferably shallower than a maximum groove depth of the center lug grooves, and the maximum groove depth of the center lug grooves is preferably shallower than a maximum depth of the shoulder lug grooves.

A ratio D1/D2 is preferably 0.05 to 0.2, in which a maximum groove depth of the central narrow groove, or the first central narrow grooves and the second central narrow groove is D1, and a maximum depth of the circumferential main grooves is D2.

A raised bottom portion formed by partially making a groove depth shallower is preferably provided in each of the pair of circumferential main grooves.

A ratio D3/T is preferably 0.01 to 0.05, in which a shallowest groove depth in the raised bottom portion is D3, and a tread width in a tire lateral direction of the tread portion on which the tread pattern is formed is T.

The tread pattern is preferably point symmetrical with respect to a center point on a tread surface of one of the center blocks.

A groove width of the circumferential main grooves and a groove width of the center lug grooves are preferably 7 mm to 20 mm.

The heavy duty pneumatic tire is preferably mounted on a construction vehicle or an industrial vehicle.

According to the heavy duty pneumatic tire of the present technology, heat build-up resistance and uneven wear resistance can both be achieved.

DETAILED DESCRIPTION

A heavy-duty pneumatic tire of the present technology is described in detail below. Heavy-duty pneumatic tires in this specification include tires described in Section C of JATMA YEAR BOOK 2014 (standards of The Japan Automobile Tyre Manufacturers Association, Inc.) and tires for Classification 1 (dump trucks, scrapers), tires for Classification 2 (graders), tires for Classification 3 (shovel loaders and the like), tires for Classification 4 (tire rollers), and tires for mobile cranes (truck cranes, wheel cranes) described in Section D, or vehicular tires described in SECTION 4 or SECTION 6 of TRA 2013 YEAR BOOK.

Tire of First Embodiment

Figure 1:
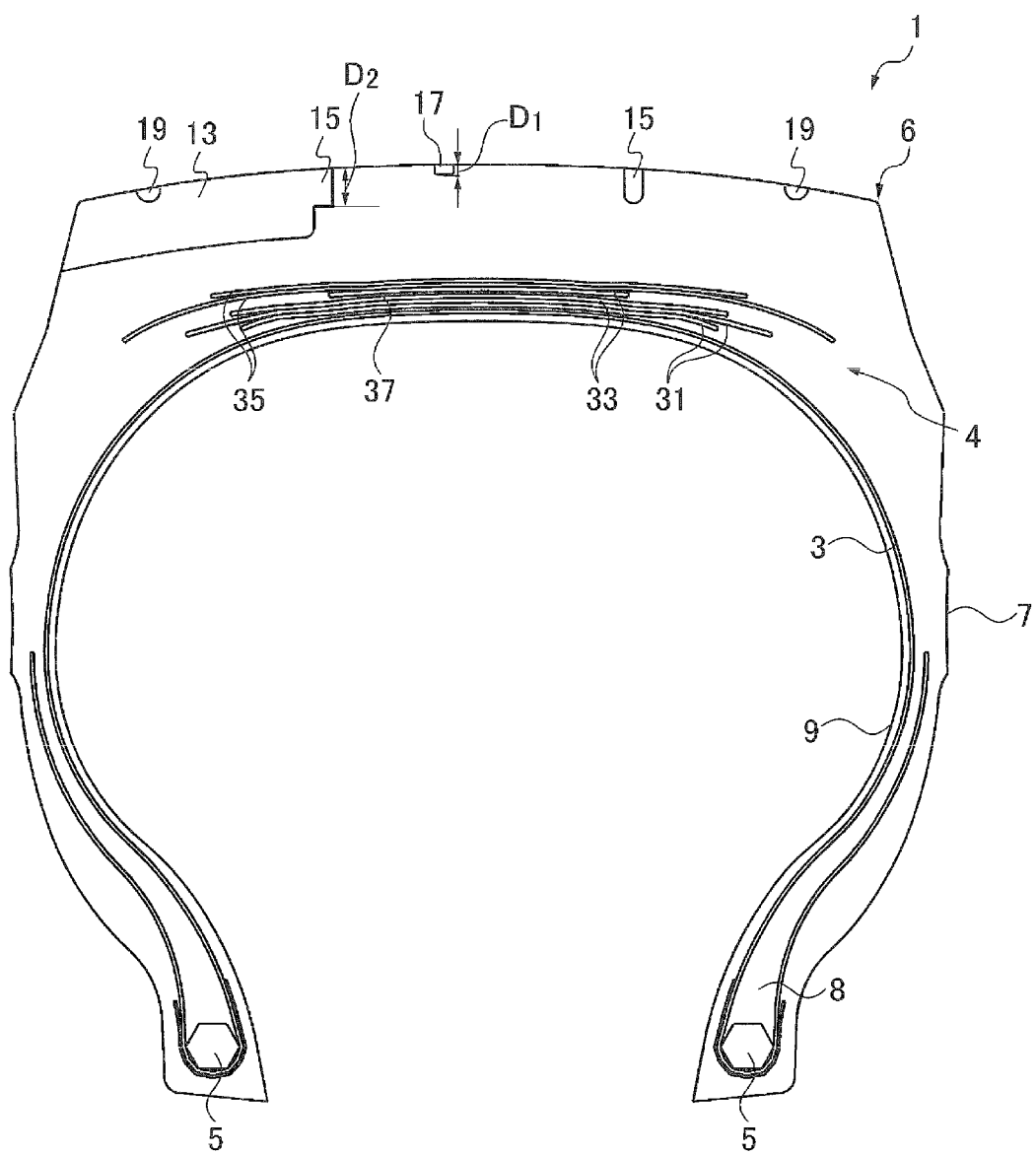
FIG. 1 is a cross-sectional view illustrating a portion of one embodiment of a heavy duty pneumatic tire of a first embodiment of the present technology.

FIG. 1 is a cross-sectional view illustrating a portion of a heavy duty pneumatic tire of one embodiment according to a first aspect.

FIG. 1 includes a tire rotation axis of a heavy duty pneumatic tire (hereinafter, referred to as tire) 1 of one embodiment, and illustrates a profile of the tire 1 when the tire 1 is cut along a plane (passing through line I-I in FIG. 2) in a tire radial direction.

The tire 1 has a carcass ply 3, belt 4, and a pair of bead cores 5 as framework members, and tread rubber 6, side rubber 7, bead fillers 8, innerliner 9, and other rubber layers around the framework members.

The belt 4 is provided with a pair of first cross belt layers 31, a pair of second cross belt layers 33, and a pair of third cross belt layers 35. Sheet rubber 37 is disposed between the second cross belt layers 33. The first cross belt layers 31, second cross belt layers 33, and third cross belt layers 35 are pairs of belt layers where a direction of a belt cord to a tire circumferential direction is inclined on mutually different sides in a tire lateral direction, and are disposed in this order from inside to outside in a tire radial direction.

Figure 2:
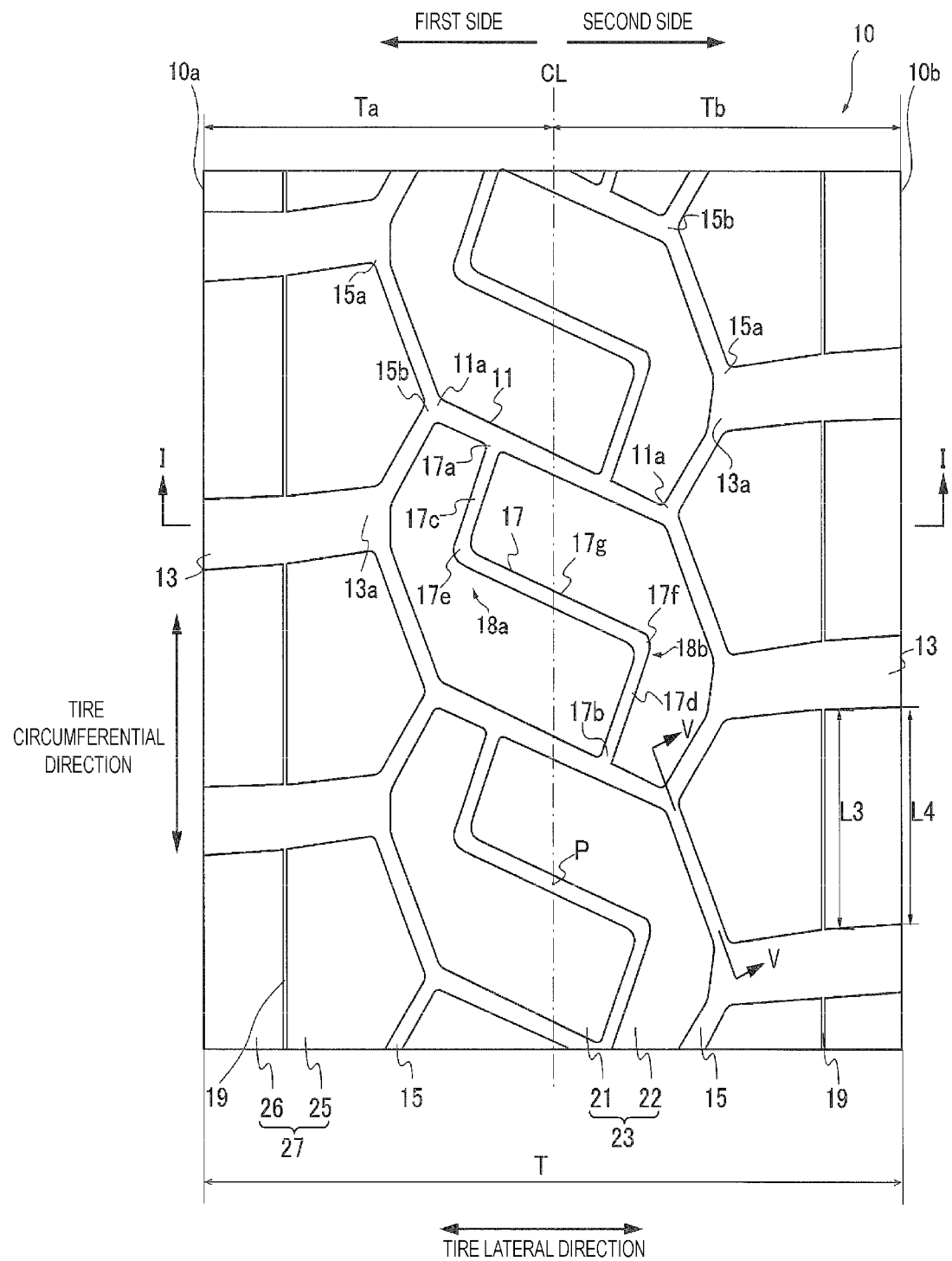
FIG. 2 is a plan developed view of a tread pattern of a heavy duty pneumatic tire of one embodiment.

The tread rubber 6 is provided with a tread pattern 10 illustrated in FIG. 2. FIG. 2 is a plan developed view of a tread pattern of the tire 1. Note that in FIG. 2, the vertical direction is the tire circumferential direction, and the horizontal direction is the tire lateral direction. Herein, "tire circumferential direction" refers to a direction of rotation of the rotating surface of the tread surface that rotates about the center axis of rotation of the tire when the tire 1 rotates. The tire lateral direction is a direction of a rotation center axis of the tire 1. The tire radial direction is a direction orthogonal to the tire circumferential direction and tire lateral direction. The direction of the tire rotation direction of the tread pattern and tire lateral direction when mounted on a vehicle is not particularly restricted.

The tread pattern 10 includes a center lug groove 11, shoulder lug groove 13, a pair of circumferential main grooves 15, center block 23, and a shoulder block 27.

A plurality of the center lug grooves 11 are provided at intervals in the tire circumferential direction. The center lug groove 11 extends in an inclined direction with respect to the tire lateral direction and tire circumferential direction to provide both ends 11a, 11a in a half tread region Ta, Tb on both sides (first side and second side) of a tire equator line CL in the tire lateral direction so as to cross the tire equator line CL. The center lug groove 11 connects second groove turning portions 15b described later of the pair of circumferential main grooves 15. As described later, the pair of circumferential main grooves 15 have mutually different phases and extend in a wave shape, and therefore, the center lug groove 11 extends in an inclined manner with respect to the tire lateral direction. The center lug groove 11 is a linear shaped groove. Therefore, block rigidity of the center block 23 is made uniform and thus uneven wear can be suppressed as compared to when the center lug groove 11 is not in a linear shape. The groove width of the center lug groove 11 is narrower than the groove width of the shoulder lug groove 13. Therefore, ground contact pressure of the center block 23 during travel is alleviated, and thus the wear life of the tire 1 is extended.

A plurality of the shoulder lug grooves 13 are provided at intervals in the tire circumferential direction in the half tread regions Ta, Tb. The shoulder lug groove 13 extends outwards in the tire lateral direction in the half tread regions Ta, Tb, and opens to a ground contact end of the ground contact ends 10a, 10b on both sides in the tire lateral direction that is near each of the shoulder lug grooves 13.

Herein, the ground contact ends 10a, 10b are determined as described below. The ground contact ends 10a, 10b are end portions in the tire lateral direction of a ground contact patch when the tire is brought into contact with a horizontal plane under conditions in which a tire 1 is assembled to a regular rim and inflated to a regular internal pressure, and an applied load is 100% of regular load. Note that "regular rim" refers to a "measured rim" as defined by JATMA (Japan Automobile Tyre Manufacturers Association, Inc.), a "Design Rim" as defined by TRA (The Tire and Rim Association, Inc.), and a "Measuring Rim" as defined by ETRTO (European Tyre and Rim Technical Organisation). Furthermore, "regular internal pressure" refers to a "maximum air pressure" as defined by JATMA, to the maximum value in "TIRE LOAD LIMITS AT VARIOUS COLD INFLATION PRESSURES" as defined by TRA, and to "INFLATION PRESSURES" as defined by ETRTO. Furthermore, "regular load" refers to a "maximum load capacity" as defined by JATMA, the maximum value in "TIRE LOAD LIMITS AT VARIOUS COLD INFLATION PRESSURES" as defined by TRA, and a "LOAD CAPACITY" as defined by ETRTO. Note that a position in the tire lateral direction of the ground contact ends 10a, 10b matches a position in the tire lateral direction of both ends of a tread width described later.

Of the shoulder lug grooves 13 positioned on both sides in the tire lateral direction, a position in the tire circumferential direction of one shoulder lug groove 13 disposed in a one of the half tread regions is between positions in the tire circumferential direction of two adjacent shoulder lug grooves 13 disposed in the other half tread region.

Furthermore, for the shoulder lug groove 13, a position in the tire lateral direction of an inside end 13a in the tire lateral direction of the shoulder lug groove 13 is more outward than a position in the tire lateral direction of an end 11a of the center lug groove 11 described later, in the half tread regions Ta, Tb, and in the tire circumferential direction, one of the shoulder lug grooves 13 is provided in a shoulder region positioned between two adjacent center lug grooves 11 that are adjacent in the tire circumferential direction from among the center lug grooves 11. Thereby, the circumferential main groove 15 described later forms a wave shape by alternatingly connecting the end 11a of the center lug groove 11 and the end 13a on an inward side in the tire lateral direction of the should groove 13 in the half tread regions Ta, Tb. The shoulder lug groove 13 has a groove width that changes in a direction in which the groove extends in FIG. 2, but the width may be constant.

The circumferential main grooves 15 are provided as a pair in the half tread regions Ta, Tb on both sides of the tire equator line CL in a tire lateral direction. Each of the circumferential main grooves 15 is formed in a wave shape around the whole circumference in the tire circumferential direction so as to alternatingly connect the end 11a of the center lug groove 11 and the end 13a on an inward side in the tire lateral direction of the shoulder lug groove 13. Specifically, the circumferential main groove 15 is provided with a first groove turning portion 15a curved or bent to form a convex shape outwards in the tire lateral direction, and a second groove turning portion 15b curved or bent to form a convex shape inward in the tire lateral direction. Thereby, the circumferential main groove 15 connects with the shoulder lug groove 13 at the first groove turning portion 15a that turns to form a convex shape outward in the tire lateral direction, and connects with the center lug groove 11 at the second groove turning portion 15b that curves to form a convex shape inward in the tire lateral direction. "Groove has a wave shape" refers to a shape where a groove meanders. The circumferential main grooves 15 have a plurality of the first groove turning portions 15a and second groove turning portions 15b on tire circumference, and extend in the tire circumferential direction while meandering to form a wave shape by alternatingly connecting the turning portions. The circumferential main groove 15 has a wave shape, and therefore, a surface area of a groove wall is increased, and heat dissipation is improved. Therefore, heat build-up resistance is improved.

The first groove turning portion 15a and second groove turning portion 15b may have a bent shape, a rounded curved shape, or a combination of a bent shape and curved shape. The curved shape also includes shapes where an apex portion of a bent shape is rounded by setting a radius of curvature, for example. "A combination of a bent shape and curved shape" refers to a first side extending in a linear shape from an apex portion of the first groove turning portion 15a or second groove turning portion 15b, and a second side extending in a curved manner from the apex portion. Of the bent shape, curved shape, or combination thereof, the first groove turning portion 15a or second groove turning portion 15b may have the same shape as the others, or may have various mutually different shapes. Furthermore, portions other than the groove turning portions of the circumferential main groove 15 may have a linear shape or a curved shape. If the first groove turning portion 15a or second groove turning portion 15b and a portion other than the first groove turning portion 15a or second groove turning portion 15b both have a curved shape, the two curved shapes may be a curved shape with the same radius of curvature.

In FIG. 2, the circumferential main groove 15 extends in a wave shape with a phase deviating in the tire circumferential direction and mutually equivalent periods. Specifically, the position in the tire circumferential direction of the second groove turning portions 15b is positionally shifted in the tire circumferential direction with regard to the second groove turning portion 15b in the half tread regions on opposite sides. Note that according to one embodiment, the circumferential main groove 15 extends in a wave shape with matching phases and mutually equivalent periods. Furthermore, according to one embodiment, the circumferential main groove 15 extends in a wave shape with mutually different periods.

A groove width of the circumferential main groove 15 is narrower than the groove width of the shoulder lug groove 13. Therefore, ground contact pressure of the center block 23 during travel is alleviated, and thus the wear life of the tire 1 is extended.

A plurality of the center blocks 23 are formed in a row in the tire circumferential direction, demarcated by the center lug groove 11 and circumferential main groove 15. The tire equator line CL passes through the center block 23. The center lug groove 11 is inclined with respect to the tire lateral direction, and therefore, the center block 23 is inclined with respect to the tire lateral direction.

A plurality of the shoulder blocks 27 are formed in a row in the tire circumferential direction, demarcated by the ground contact ends 10a, 10b provided with the tread rubber 6 and contacts a road surface, the circumferential main grooves 15, and a pair of adjacent shoulder lug grooves 13 adjacent in the tire circumferential direction of the shoulder lug grooves 13, in the half tread regions Ta, Tb. In the example illustrated in FIG. 2, the shoulder block 27 is inclined on a side that is different from the side where the center block 23 is inclined with respect to the tire equator line CL.

The tire tread pattern 10 of the first embodiment is further provided with a central narrow groove 17, in addition to the "basic form" described above. Note that the tire 1 provided with the tread pattern 10 of a second embodiment described later is also provided with the "basic form" described above.

The central narrow groove 17 extends through a region of the center block 23. Therefore, the center block 23 is divided into two regions 21, 22 that sandwich the central narrow groove 17. The central narrow groove 17 has opening ends 17a, 17b that open in an adjacent center lug groove 11 at a position in the tire lateral direction away from the tire equator line CL. Both ends of the central narrow groove 17 open in the center lug groove 11, and therefore, the passage of air in the center region (region interposed between the pair of circumferential main grooves 15) is favorable, and heat build-up resistance is improved. Furthermore, the opening ends 17a, 17b are positioned in the tire lateral direction not including the tire equator line CL, and the central narrow groove 17 has a non-linear shape, and therefore, the central narrow groove 17 has a sufficient groove volume, and thus the center block 23 can be sufficiently cooled. In the example illustrated in FIG. 2, the opening end 17a and opening end 17b are positioned in mutually different half tread regions, and the central narrow groove 17 intersects with the tire equator line CL, but according to another embodiment, the ends are positioned in the same half tread region. In this case, in order to sufficiently provide groove volume, the central narrow groove 17 preferably intersects with the tire equator line CL.

If the opening end 17a and opening end 17b are positioned in mutually different half tread regions, the opening end 17a and opening end 17b are preferably positioned on one side in the tire lateral direction where the center block 23 is inclined with respect to the tire equator line CL, such that an imaginary straight line that connects the opening ends 17a and opening end 17b is also inclined with respect to the tire equator line CL. Specifically, as with the example illustrated in FIG. 2, the opening end 17a is preferably positioned in the half tread region Ta and the opening end 17b is preferably positioned in the half tread region Tb, as compared to a form where the opening end 17a is positioned in the half tread region Tb and the opening end 17b is positioned in the half tread region Ta. Thereby, the central narrow groove 17 has a sufficient groove volume, and thus heat build-up resistance can be improved.

The groove width of the central narrow groove 17 is narrower than the groove width of the shoulder lug groove 13.

The central narrow groove 17 has: a portion 17c extending outward in the tire lateral direction from the opening end 17a, in the half tread region Ta where the opening end 17a is positioned; and a portion 17d extending outward in the tire lateral direction from the opening end 17b, in the half treat region Tb where the opening end 17b is positioned. Due to the central narrow groove 17 providing the portions 17c, 17d, the ground contact pressure fluctuates at the same position in the tire lateral direction in accordance with a rotation when the tire 1 rotates, and therefore, stress concentration at a specific position in the center block 23 can be avoided. More specifically, if a portion that does not contact a road surface when the tire 1 rotates is always in the same position in the tire lateral direction, in other words, if a position that does not contact a road surface does not fluctuate in the tire lateral direction as with a linear shaped groove extending in the tire circumferential direction, stress is concentrated at the position, and early wear easily occurs, but due to the portions 17c, 17d extending outward in the tire lateral direction, a portion of the groove not contacting a road surface during tire rotation fluctuates in the tire circumferential direction, and thus a position on which stress is concentrated can be dispersed. In particular, the portions 17c, 17d extend outward in the tire lateral direction so as to be away from the tire equator line CL, and therefore, during tire rotation, a portion not contacting a road surface as with a portion of the groove can fluctuation across a wide range in the tire lateral direction.

Note that when central narrow groove 17 is a first central narrow groove, the tread pattern 10 preferably further provides one or a plurality of second central narrow grooves that are different from the first central narrow groove, in a region of the center block 23, according to another embodiment. The groove width of the second central narrow groove is narrower than the groove width of the shoulder lug groove 13, and for example, is equal to the groove width of the first central narrow groove. According to one embodiment, the second central narrow groove has both ends opened in the adjacent center lug grooves 11. Furthermore, according to one embodiment, a first end opens at the center lug groove 11, and a second end is closed. Furthermore, according to one embodiment, both ends close in a region of the center block 23. According to one embodiment, the second central narrow groove opens in the circumferential main groove 15 instead of opening in the center lug groove 11. According to one embodiment, the second central narrow groove connects with the first central narrow groove. According to one embodiment, groove does not connect with the first central narrow groove. According to one embodiment, if the second central narrow groove is connected with the first central narrow groove, the groove intersects the first central narrow groove. According to one embodiment, the second central narrow groove is formed so as to extend continuously such that the center lug groove 11 and the first central narrow groove or second central narrow groove of the adjacent center block 23 are sandwiched. According to one embodiment, a maximum groove depth of the second central narrow groove is preferably shallower than a maximum groove depth of the circumferential main groove 15, and for example, is equal to a maximum groove depth of the first central narrow groove.

In the tire 1, a maximum groove depth of the circumferential main groove 15 is preferably shallower than a maximum groove depth of the center lug groove 11, and the maximum groove depth of the center lug groove 11 is preferably shallower than a maximum depth of the shoulder lug groove 13. Based on this groove depth order, the circumferential main groove 15 and center lug groove 11 disappear in order from a tread surface and the shoulder lug groove 13 remains to the end in conjunction with wearing of the tire 1. A center region in a tread portion has high ground contact pressure, and heat easily builds up due to the center block 23 repeatedly deforming. Therefore, in order to improve the heat build-up resistance, a maximum groove depth of the center lug groove 11 is preferably larger than a maximum groove depth of the circumferential main groove 15. Furthermore, when the maximum groove depth of the circumferential main groove 15 is too large, the rigidity of the tread rubber 6 cannot be sufficiently ensured, and the wear life is shortened, and therefore, the maximum groove depth of the circumferential main groove 15 is preferably shallower than the maximum groove depth of the center lug groove 11. Note that "maximum groove depth" refers to a maximum groove depth if a groove depth in a direction in which a groove extends is not constant, and refers to a groove depth if a groove depth in a direction in which a groove extends constant. For example, if the circumferential main groove 15 is provided with a raised bottom portion 15c described later, the maximum groove depth is a depth of a portion of the circumferential main groove 15 where a bottom is not raised.

Figure 3A:
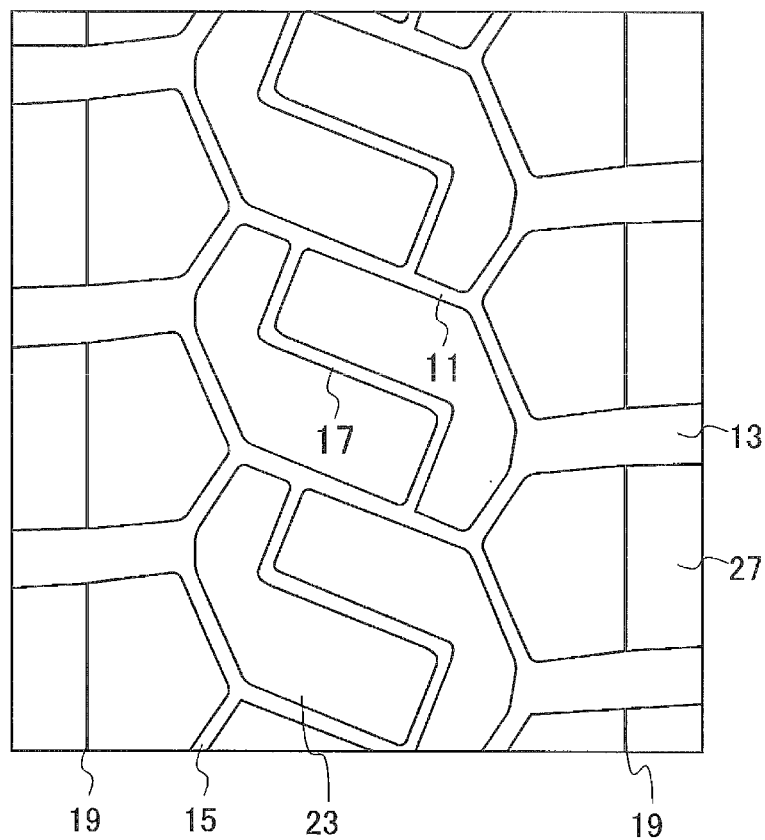
FIG. 3A is a view illustrating an example of a tread pattern of a heavy duty pneumatic tire of one embodiment in an early stage of wear.
Figure 3B:
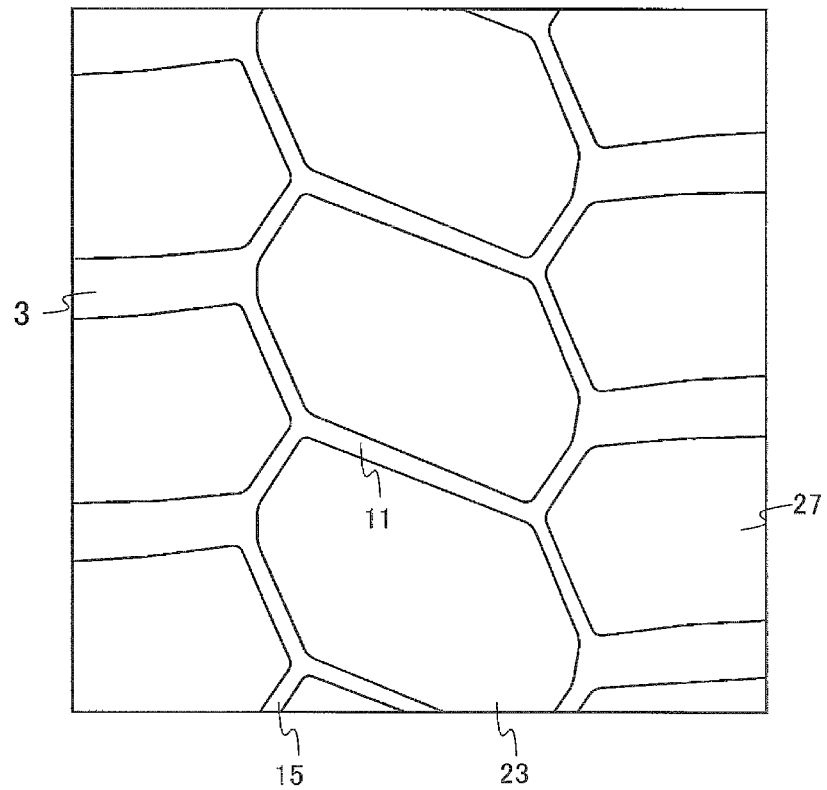
FIG. 3B is a view illustrating an example of a tread pattern of a heavy duty pneumatic tire of one embodiment where wearing has further advanced.

According to one embodiment, in the tire 1, a maximum groove depth of the central narrow groove 17 is preferably shallower than a maximum groove depth of the circumferential main groove 15. By the maximum groove depth being shallower than the maximum depth of the circumferential main groove 15, when the tire 1 is worn, the central narrow groove 17 disappears faster than the circumferential main grooves 15 as illustrated in FIG. 3B. FIG. 3B is a view illustrating the tire 1 where wear has advanced more than the early stages of wear. FIG. 3A is a view illustrating a tread pattern of the tire 1 in the early stages of wear. "The early stages of wear" refers to a stage of wear of the tire 1 where a groove with a shallowest groove depth has still not disappeared, which includes when the tire 1 is new.

According to one embodiment, when the maximum groove depth of the central narrow groove 17 is set to D1 and the maximum groove depth of the circumferential main groove 15 is set to D2 for the tire 1, the ratio D1/D2 is preferably 0.05 to 0.2. When the ratio D1/D2 exceeds 0.2, the rigidity of the center block 23 may be reduced and thus uneven wear may easily occur, and the amount of rubber in the center block 23 may be insufficient and thus wear resistance may be reduced. Furthermore, if the ratio D1/D2 is lower than 0.05, the central narrow groove 17 at the early stages of wear does not sufficiently function as a passage for air, and thus heat build-up resistance is difficult to improve. The ratio D1/D2 is more preferably 0.1 to 0.2. Note that "groove depth" for the grooves included in the tread pattern 10 simply refers to as the maximum groove depth. Furthermore, in a cross section cut by line I-I, a portion where the raised bottom portion 15c described later is positioned is expressed in the circumferential main groove 15, but for convenience of description, groove depth D2 of the circumferential main groove 15 is illustrated in place of groove depth D3 (described later) of the raised bottom portion 15c in FIG. 1.

Figure 4:
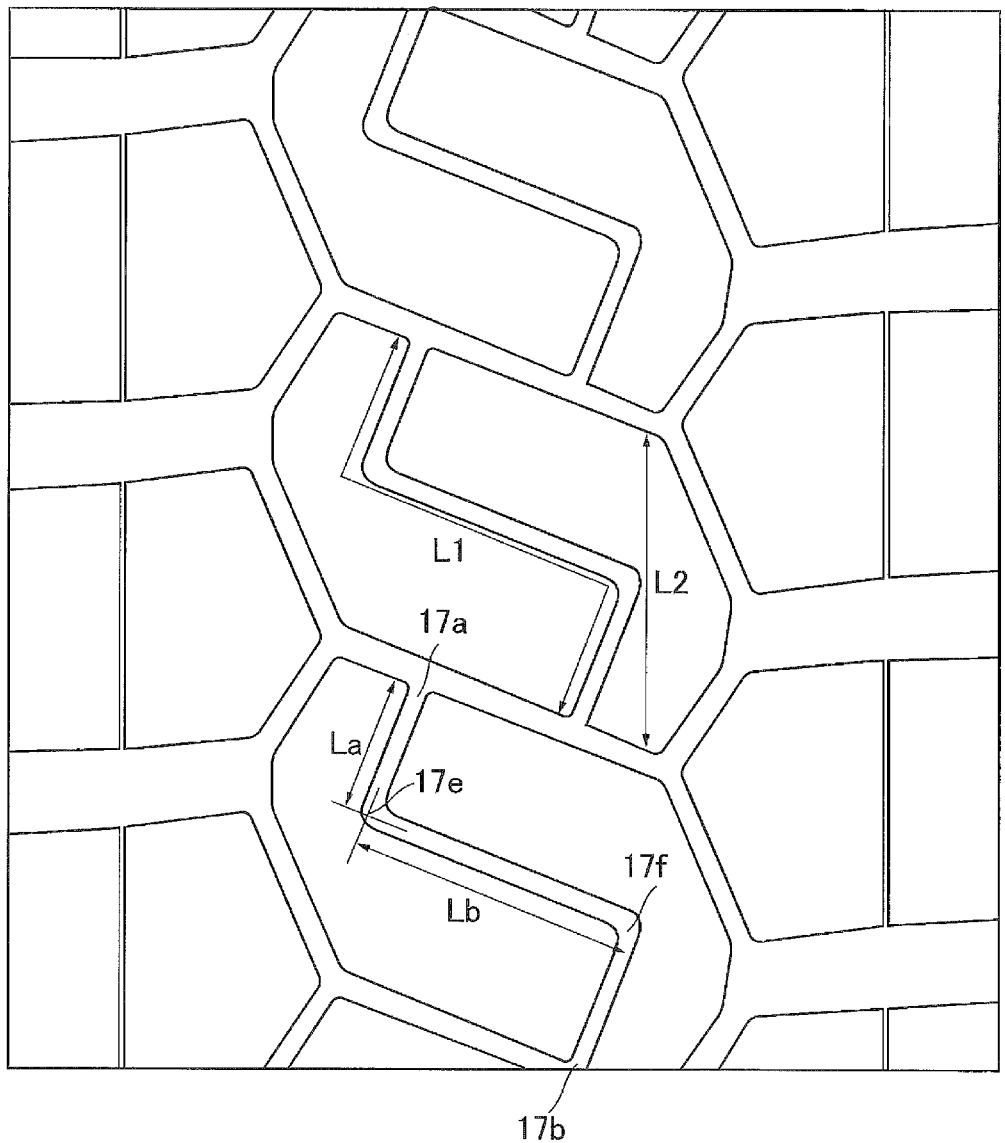
FIG. 4 is a plan developed view of an example of a tread pattern of a heavy duty pneumatic tire of one embodiment.

In the tire 1, if a groove length of the central narrow groove 17 is set to L1 and a tire circumferential direction length of the center block 23 is set to L2 as illustrated in FIG. 4, the ratio L1/L2 is preferably higher than 1.8 and is 2.2 or lower according to one embodiment. FIG. 4 is a plan developed view of an example of a tread pattern of a heavy duty pneumatic tire of one embodiment. FIG. 4 illustrates the same tread pattern as FIG. 2. Note that L2 is constant in the tire lateral direction in an example illustrated in FIG. 4, but for example, if adjacent center lug grooves 11 are not parallel with each other, the tire circumferential direction length of the center block 23 is referred to as a maximum length. If the ratio L1/L2 exceeds 1.8, the central narrow groove 17 with a sufficient groove volume in a region of the center block 23 is present, and thus heat build-up resistance can be improved. On the other hand, if the ratio L1/L2 exceeds 1.8 and the maximum groove depth of the central narrow groove 17 is shallower than the maximum groove depth of the circumferential main groove 15 even if the rigidity of the center block 23 is reduced, the central narrow groove 17 disappears in the relatively early stage due to the aforementioned wear, and therefore, the reduction of the rigidity of the center block 23 is suppressed. In other words, if heat build-up resistance in the early stages of wear due to the ratio L1/L2 exceeding 1.8 and if the maximum groove depth of the central narrow groove 17 is shallower than the maximum groove depth of the circumferential main groove 15, reduction of the rigidity of the center block 23 is suppressed, and thus wear life can be extended. If the ratio L1/L2 is 1.8 or lower, the central narrow groove 17 is less likely to sufficiently function as an air passage. Furthermore, if the ratio L1/L2 is 2.2 or lower, rigidity reduction of the center block 23 can be suppressed, and thus uneven wear can be suppressed from occurring. If the ratio L1/L2 exceeds 2.2, the rigidity of the center block 23 may be reduced, and thus uneven wear may occur. The ratio L1/L2 is more preferably 1.9 to 2.1.

Figure 5:
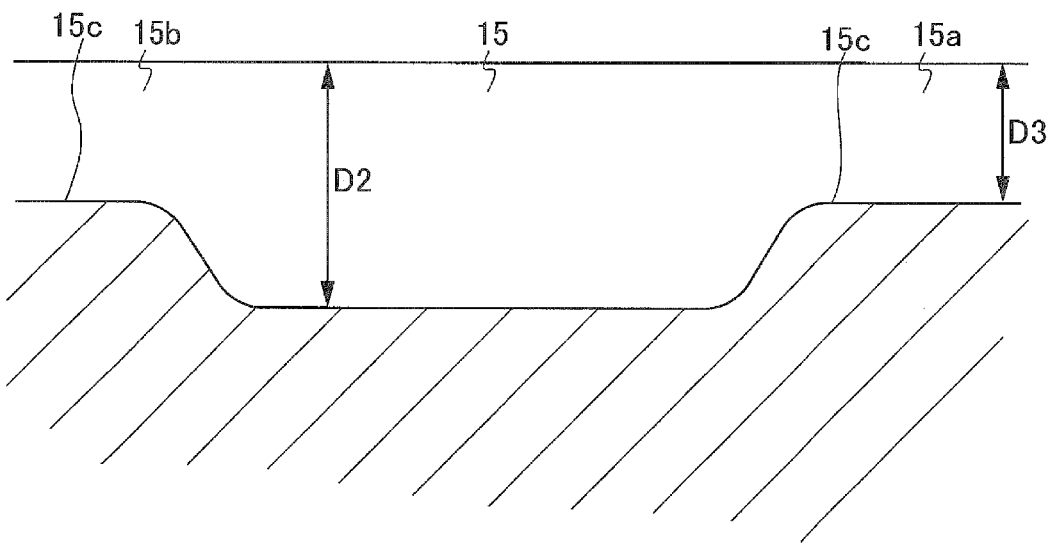
FIG. 5 is a cross-sectional view of a raised bottom portion of a circumferential main groove in a heavy duty pneumatic tire of one embodiment.

As illustrated in FIG. 5, the tire 1 is preferably provided with the raised bottom portion 15c with a partially shallowed groove in the circumferential main grooves 15. FIG. 5 is a cross-sectional view of a raised bottom portion of a circumferential main groove in a heavy duty pneumatic tire of one embodiment. FIG. 5 illustrates a profile of a portion of a tread portion when the tire 1 is cut at a plane passing through line V-V in FIG. 2. The raised bottom portion 15c has a groove bottom that is raised corresponding to a position where the first groove turning portion 15a and second groove turning portion 15b are disposed. Thereby, the circumferential main groove 15 is provided with the raised bottom portion 15c at a position connected with the center lug groove 11 and shoulder lug groove 13, and therefore, the adjacent center block 23 and shoulder block 27 support each other to suppress collapsing of the blocks, and thus block rigidity is at an appropriate level. Thereby, early wear due to uneven wear can be suppressed. Note that a middle region of the circumferential main groove 15 extending between adjacent raised bottom portions 15c has a sufficient groove volume due to a deep groove depth, and thus heat build-up resistance is improved.

The raised bottom portion 15c may have a constant groove depth D3 as illustrated in the drawing, or the groove depth may not be constant. Note that the groove depth D3 is referred to a shallowest groove depth in the raised bottom portion 15c, which is a minimum groove depth of the circumferential main groove 15. The raised bottom portion 15c is formed at a position corresponding with the first groove turning portion 15a and second groove turning portion 15b in an example illustrated in FIG. 5, but may be formed in the middle region.

According to one embodiment, the ratio D3/T is preferably 0.01 to 0.05 with regard to the shallowest groove depth D3 in the raised bottom portion 15c (refer to FIG. 5) and a tread width T in the tire lateral direction of a tread portion (refer to FIG. 2). "Tread width T" refers to a periphery length along an outer shape between both ground contact ends 10a, 10B in the tire lateral direction of a tread portion. If the ratio D3/T is 0.05 or lower, the block rigidity is a more appropriate level due to the center block 23 and shoulder block 27 supporting each other, and thus early wear due to uneven wear can be suppressed. Furthermore, if the ratio D3/T is 0.01 or higher, the passage of air in the groove can be prevented from deteriorating. The ratio D3/T is more preferably 0.02 to 0.04.

According to one embodiment, the central narrow groove 17 of the tire 1 preferably has one turning out portion 18a or 18b extending so as to protrude outward in the tire lateral direction with regard to the tire equator line CL, in each of the half tread regions Ta, Tb. The turning out portions 18a, 18b are portions that are bent due to the direction of the extending groove changing on the tread surface of the central narrow grooves 17, and specifically may be a bent shape, a rounded curved shape, or a combination of a bent shape and curved shape. The curved shape also includes shapes where the entire turning out portions 18a, 18b are rounded by setting a radius of curvature, and shapes where apex portions 17e, 17f (refer to FIG. 2) with a bent shape are rounded by setting a radius of curvature, for example, as with the example illustrated in FIG. 2. "A combination of a bent shape and curved shape" refers to a first side of the apex portions 17e, 17f of the turning out portions 18a, 18b extending in a linear shape, and a second side extending in a curved manner from the apex portions 17e, 17f. Of the bent shape, curved shape, or combination thereof, the turning out portions 18a, 18b may use the same shape as each other, or may use various mutually different shapes. Furthermore, portions other than the turning out portions 18a, 18b of the central narrow grooves 17 may have a linear shape or a curved shape. In the example illustrated in FIG. 2, portions other than the turning out portions 18a, 18b have a linear shape. If the turning out portions 18a, 18b and portions other than the turning out portions 18a, 18b both have a curved shape, the two curved shapes may be a curved shape with the same radius of curvature.

Note that in the example illustrated in FIG. 2, the turning out portion 18a and turning out portion 18b are connected through a portion 17g extending in a linear shape, so as to intersect the tire equator line CL.

The central narrow groove 17 has the turning out portions 18a, 18b, and therefore, the block rigidity of regions 21, 22 divided in two by the central narrow groove 17 is appropriate, and thus uneven wear is suppressed from occurring. Furthermore, the region of the center block 23 has a sufficient groove volume, and thus heat build-up resistance is improved. If only one turning out portion is disposed in the central narrow groove 17, or if the turning out portion is disposed in only one half tread region, a bias in block rigidity occurs, and thus uneven wear is prone to occur.

In the tire 1, if the length of a portion of the central narrow groove 17 extending from the opening ends 17a, 17b to the apex portions 17e, 17f of the turning out portions 18a, 18b is set as La (refer to FIG. 4), and the length of a portion of the central narrow groove extending between the apex portions of the turning out portions is set as Lb (refer to FIG. 4), Lb is preferably longer than La. If the turning out portions 18a, 18b have a bent shape, the apex portions 17e, 17f of the turning out portions 18a, 18b are a turning point thereof, and if a shape where the turning out portions 18a, 18b are rounded by setting a radius of curvature, the apex portions are midpoints (midpoint on an arc) 17e, 17f of a groove length of a portion having the rounded shape. If Lb is longer than La, the turning out portion 18a and turning out portion 18b are sufficiently separated from each other, and the block rigidity in the regions 21, 22 divided in two by the central narrow groove 17 is more appropriate, and thus uneven wear is further suppressed from occurring.

According to one embodiment, as illustrated in FIG. 2, the tread pattern 10 of the tire 1 preferably includes a shoulder narrow groove 19 extending in a region of the shoulder block 27, opening in adjacent shoulder lug grooves 13, and having a groove width that is narrower than the groove width of the shoulder lug groove 13, in the half tread regions Ta, Tb. The shoulder narrow groove 19 where both ends open in the shoulder lug groove 13 is provided in the region of the shoulder block 27, and therefore, the surface area of the tread rubber 6 is increased, and the passage of air is favorable, and thus heat build-up resistance is improved. Furthermore, the groove width of the shoulder narrow groove 19 is narrower than the groove width of the shoulder lug groove 13. Note that the shoulder block 27 includes two regions 25, 26 divided in two by the shoulder narrow groove 19.

The shoulder narrow groove 19 has a linear shape in the example illustrated in FIG. 2, but may not have a linear shape, and may have the same groove turning portion as the groove turning portions 15a, 15b of the circumferential main groove 15, for example. The shoulder narrow groove 19 extends in the tire circumferential direction in the example illustrated in FIG. 2, but may extend in an inclined manner with respect to the tire circumferential direction. As illustrated in FIG. 2, adjacent shoulder narrow grooves 19 that are adjacent in the tire circumferential direction may be connected at the same position in the tire lateral direction with respect to the shoulder lug groove 13, or may be connected at a different position in the tire lateral direction.

If the length of the shoulder narrow groove 19 of the tire 1 is L3 (refer to FIG. 2), and the minimum length in a tire circumferential direction of the shoulder block is L4 (refer to FIG. 2), the ratio L3/L4 is preferably 1.0 to 1.4 according to one embodiment. If the ratio L3/L4 is 1.0 or higher, the shoulder narrow groove 19 opens in both adjacent shoulder lug grooves 13 at least at a position where L4 is a minimum. Furthermore, if the ratio L3/L4 is 1.4 or lower, uneven wear due to reduced block rigidity of the shoulder block 27 can be suppressed. Note that the length in the tire circumferential direction of the shoulder block 27 may be constant in the tire lateral direction, or may not be constant as with the example illustrated in FIG. 2. Note that L4 is a tire circumferential direction length at a tire lateral direction position where the tire circumferential direction length is minimal in the shoulder block 27.

According to one embodiment, the tread pattern 10 of the tire 1 is preferably point symmetrical with a center point P (refer to FIG. 2) in a tread surface of the center block 23. The tread pattern 10 has the form, and therefore, rigidity is uniform on both side in the tire lateral direction, and thus uneven wear can be suppressed. If the pattern is not point symmetrical, a bias in rigidity occurs, and thus uneven wear is prone to occur. Note that in the tread pattern 10, the center blocks 23 have the same shape in the center block example.

According to one embodiment, the groove widths of the circumferential main grooves 15 and the plurality of center lug grooves 11 are preferably 7 mm to 20 mm in the tire 1. The size of the groove widths of the circumferential main groove 15 and center lug groove 11 is 18 mm, for example. Note that the groove widths of the circumferential main groove 15 and center lug groove 11 are preferably within the aforementioned range if the tire 1 is used as an off-road tire. In this case, the groove widths of the central narrow groove 17 and shoulder narrow groove 19 are preferably 7 to 20 mm.

According to one embodiment, the tire 1 is preferably mounted on a construction vehicle or industrial vehicle. Examples of construction vehicles and industrial vehicles include a dump truck, scraper, grader, shovel loader, tire roller, wheel crane, truck crane as described in JATMA, as well as a compactor, earth mover, grader, loader, and dozer as described in TMA, and other vehicles.

Figure 6:
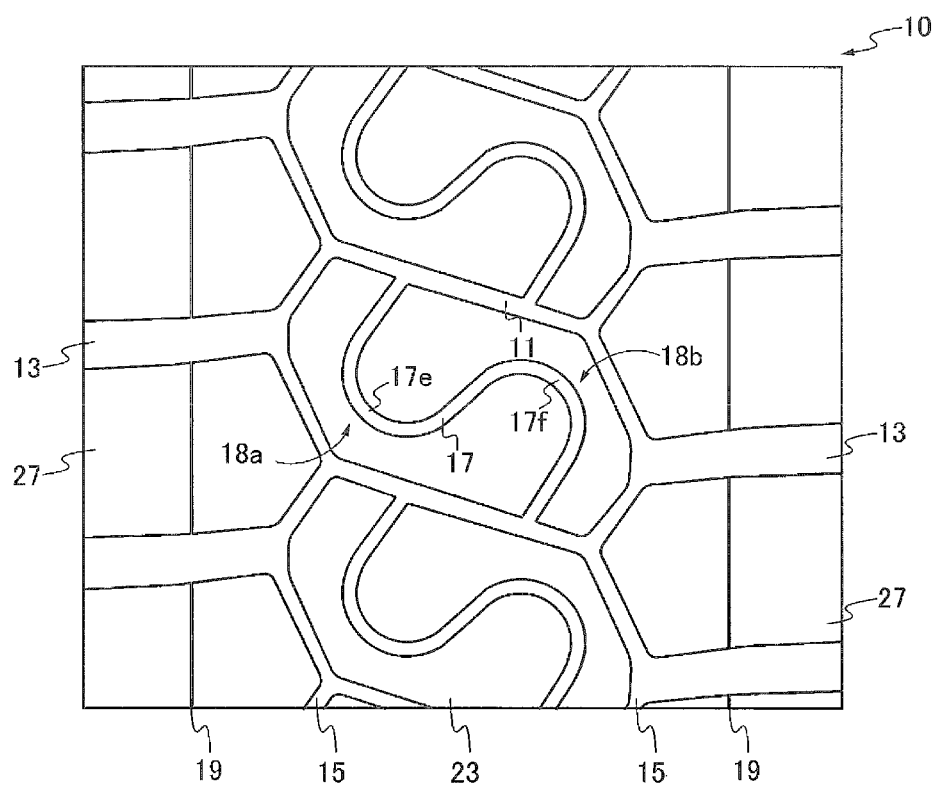
FIG. 6 is a view illustrating a modified example of the tread pattern illustrated in FIG. 2.
Figure 7:
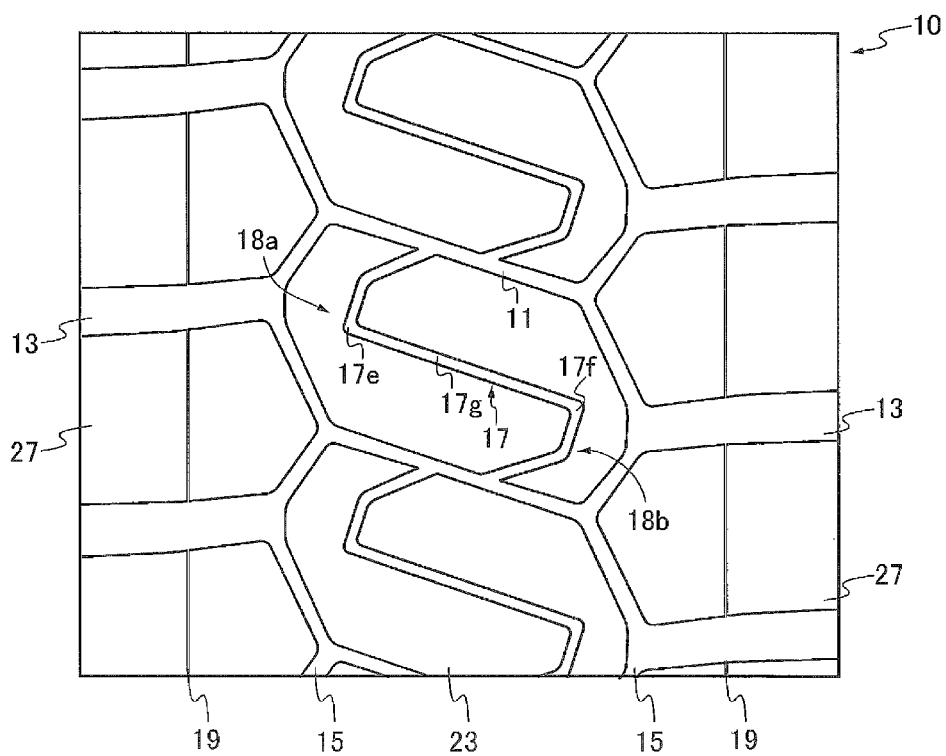
FIG. 7 is a view illustrating another modified example of the tread pattern illustrated in FIG. 2.

The tire 1 may have a tread pattern 10 illustrated in FIG. 6 or FIG. 7 in addition to the example illustrated in FIG. 2, as modified examples. FIG. 6 and FIG. 7 are both views illustrating modified examples of the tread pattern in FIG. 2. In FIG. 6 and FIG. 7, the same reference sign as those used in FIG. 2 are used on elements corresponding to the elements included in the tread pattern 10 illustrated in FIG. 2.

In FIG. 6, the turning out portions 18a, 18b have a shape where the entire shape is rounded by setting a radius of curvature, and midpoints on an arc are apex portions 17e, 17f. Furthermore, in FIG. 7, the turning out portions 18a, 18b have two bent shape portions that sandwich a portion extending in a linear shape, and of these, the bent shape portions positioned further outward in the tire lateral direction are the apex portions 17e, 17f. In the modified examples illustrated in FIG. 6 and FIG. 7, a length Lb of the portion 17g extending between the two apex portions 17e, 17f is longer than a length La of the portion 17c extending from the opening end 17a to the apex portion 17e (portion 17d extending from the opening 17b to the apex portion 17f).

According to the heavy duty pneumatic tire 1, the center lug groove 11 has a linear shape, and therefore, the block rigidity of adjacent center blocks 23 in the tire circumferential direction is uniform, and thus uneven wear can be suppressed. Furthermore, the central narrow groove 17 that opens in adjacent center lug grooves 11 is provided, and therefore, the passage of air in a center region is favorable, and thus the heat build-up resistance is improved. Furthermore, the central narrow groove 17 has the portions 17c, 17d extending outward in the tire lateral direction from the opening ends 17a, 17b, and therefore, a position not contacting the ground in the center region changes in the tire lateral direction in accordance with the rolling motion of the tire, and thus stress concentrating at the same position in the tire lateral direction can be avoided, and early tire wear can be suppressed from occurring.

If the maximum groove depth of the circumferential main groove 15 is shallower than the maximum groove depth of the center lug groove 11, and the maximum groove depth of the center lug groove 11 is shallower than the maximum groove depth of the shoulder lug groove 13, the heat build-up resistance can be improved, and the tread rubber 6 of the center block 23 can have sufficient rigidity, thereby extending the wear life.

If the ratio D1/D2 is 0.2 or lower, the center block 23 has a sufficient amount of rubber, and thus reduction of the wear resistance can be suppressed in conjunction with suppressing rigidity reduction of the center block 23 and suppressing uneven wear from occurring. Furthermore, if the ratio D1/D2 is 0.05 or higher, the central narrow groove 17 at the early stages of wear sufficiently functions as a passage for air, and thus heat build-up resistance is improved.

If the ratio L1/L2 exceeds 1.8, the region of the center block 23 has a sufficient groove volume, and therefore, heat build-up resistance can be improved. On the other hand, if the maximum groove depth of the central narrow groove 17 is shallower than the maximum groove depth of the circumferential main groove 15 even if the ratio L1/L2 exceeds 1.8, the central narrow groove 17 disappears in the relatively early stage due to the aforementioned wear, and therefore, the reduction of the rigidity of the center block 23 is suppressed. In other words, if heat build-up resistance in the early stages of wear due to the ratio L1/L2 exceeding 1.8 and if the maximum groove depth of the central narrow groove 17 is shallower than the maximum groove depth of the circumferential main groove 15, wear life can be extended. If the ratio L1/L2 is 1.8 or lower, the central narrow groove 17 is less likely to sufficiently function as an air passage. Furthermore, if the ratio L1/L2 is 2.2 or lower, uneven wear due to reduced rigidity of the center block 23 can be suppressed from occurring.

The central narrow groove 17 has the turning out portions 18a, 18b, and therefore, the block rigidity of regions 21, 22 divided in two by the central narrow groove 17 is appropriate, and thus uneven wear is suppressed from occurring. Furthermore, the region of the center block 23 has a sufficient groove volume, and therefore, heat build-up resistance is improved.

With regard to the aforementioned La and Lb, Lb is longer than La, and therefore, the turning out portion 18a and turning out portion 18b are sufficiently separated from each other, block rigidity in the regions 21, 22 divided in two by the central narrow groove 17 is more likely to be more appropriate, and uneven wear is further suppressed from occurring.

The tread pattern 10 includes the shoulder narrow groove 19, and therefore, the surface area of the tread rubber 6 is increased, and the passage of air is favorable, and thus the heat build-up resistance is improved.

With regard to the ratio L3/L4, the ratio L3/L4 is 1.0 or higher, and if the ratio L3/L4 is 1.0, the shoulder narrow groove 19 opens on both ends in adjacent shoulder lug grooves 13 at a position where the tire circumferential direction length of the shoulder block 27 is a minimum. Furthermore, if the ratio L3/L4 is 1.4 or lower, uneven wear due to reduced block rigidity of the shoulder block 27 can be suppressed.

By being point symmetrical with respect to the center point P on a tread surface of the center block 23, the rigidity of the tread rubber 6 is uniform on both sides in the tire lateral direction, and thus uneven wear can be suppressed.

The groove widths of the circumferential main groove 15 and center lug groove 11 are 7 mm to 20 mm, and therefore, the tire can be suitably used as an off-road tire.

The tire 1 can be preferably mounted to a construction vehicle or industrial vehicle.

Tire of Second Embodiment

Figure 8:
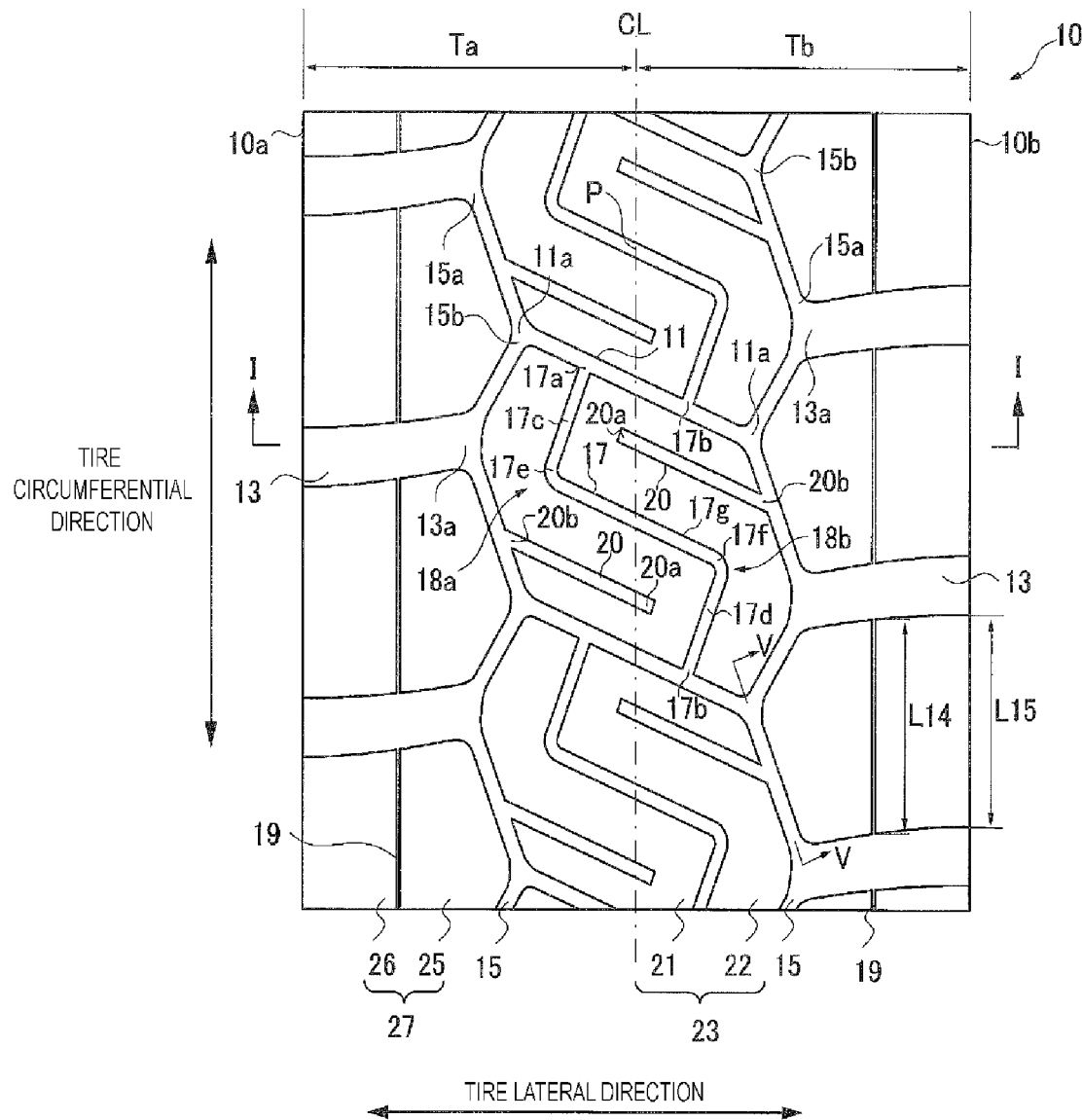
FIG. 8 is a plan developed view of an example of a tread pattern of one embodiment of a heavy duty pneumatic tire of a second embodiment of the present technology.

FIG. 8 is a plan developed view of an example of a tread pattern of one embodiment of a heavy duty pneumatic tire of a second embodiment of the present technology.

A tread pattern 10 illustrated in FIG. 8 includes a center lug groove 11, shoulder lug groove 13, a pair of circumferential main grooves 15, center block 23, and a shoulder block 27, similar to the treat pattern 10 illustrated in FIG. 2 of the first embodiment.

Figure 9:
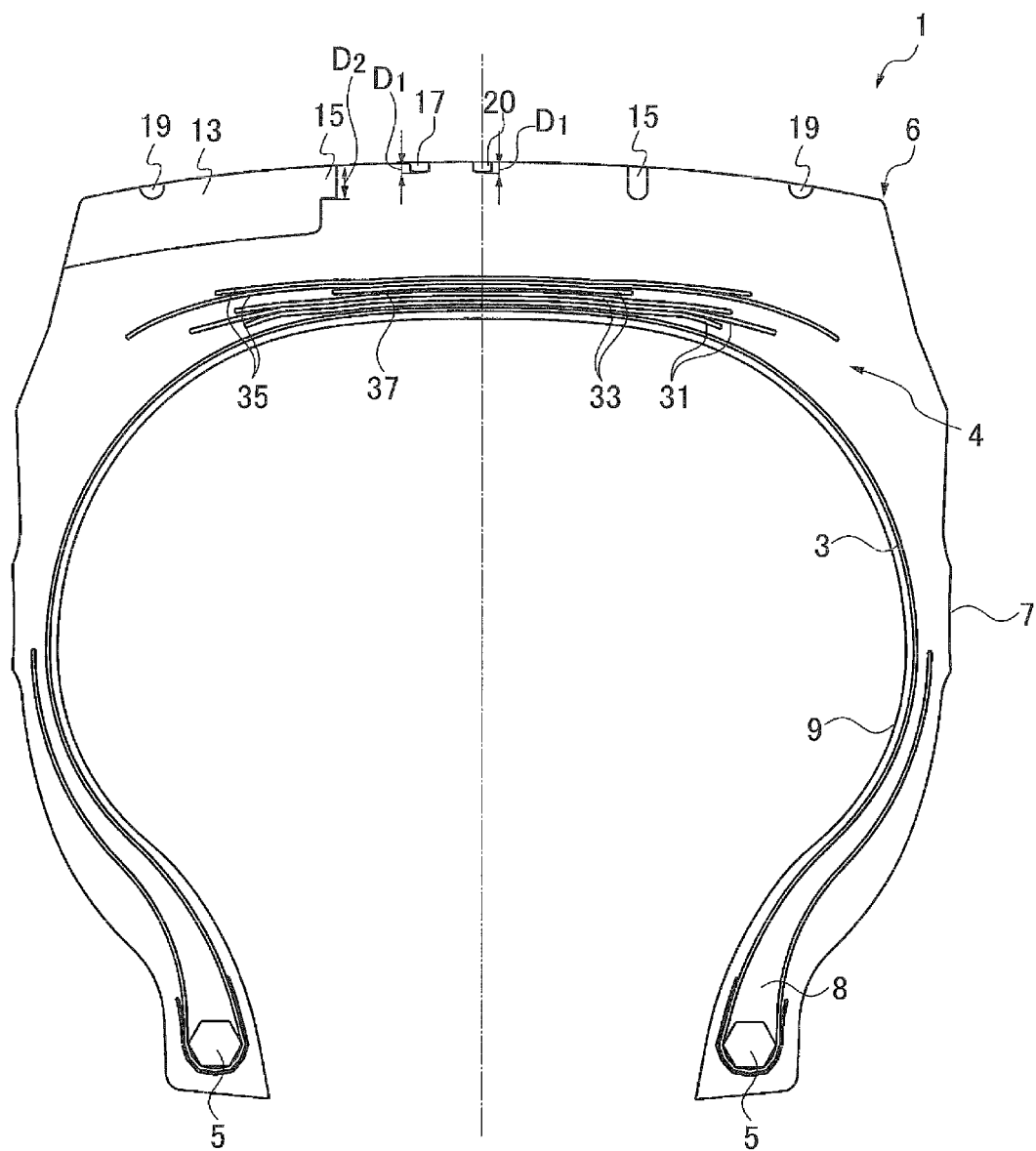
FIG. 9 is a cross-sectional view illustrating a portion of a heavy duty pneumatic tire having the tread pattern illustrated in FIG. 8.

FIG. 9 is a cross-sectional view illustrating a portion of a tire 1 having the tread pattern 10 illustrated in FIG. 8.

The tire 1 illustrated in FIG. 9 is configured to have a carcass ply 3, belt 4, and a pair of bead cores 5 as framework members, and tread rubber 6, side rubber 7, bead fillers 8, innerliner 9, and other rubber layers around the framework members, which is the same configuration as the tire 1 illustrated in FIG. 1, and therefore, a description of members cites description details of the "basic form" described for the tire of the first embodiment.

The tread pattern 10 illustrated in FIG. 8 includes the same center lug groove 11, shoulder lug groove 13, pair of circumferential main grooves 15, and shoulder block 27 as the tread pattern 10 illustrated in FIG. 2, and therefore, a description of these portions cite description details of the "basic form" described for the tire of the first embodiment. Herein, a central narrow groove provided in a region of a center block 23 includes a first central narrow groove 20 and second central narrow groove 17. The second central narrow groove 17 has the same configuration as the central narrow groove 17 illustrated in FIG. 2 of the tire of the first embodiment.

Figure 13:
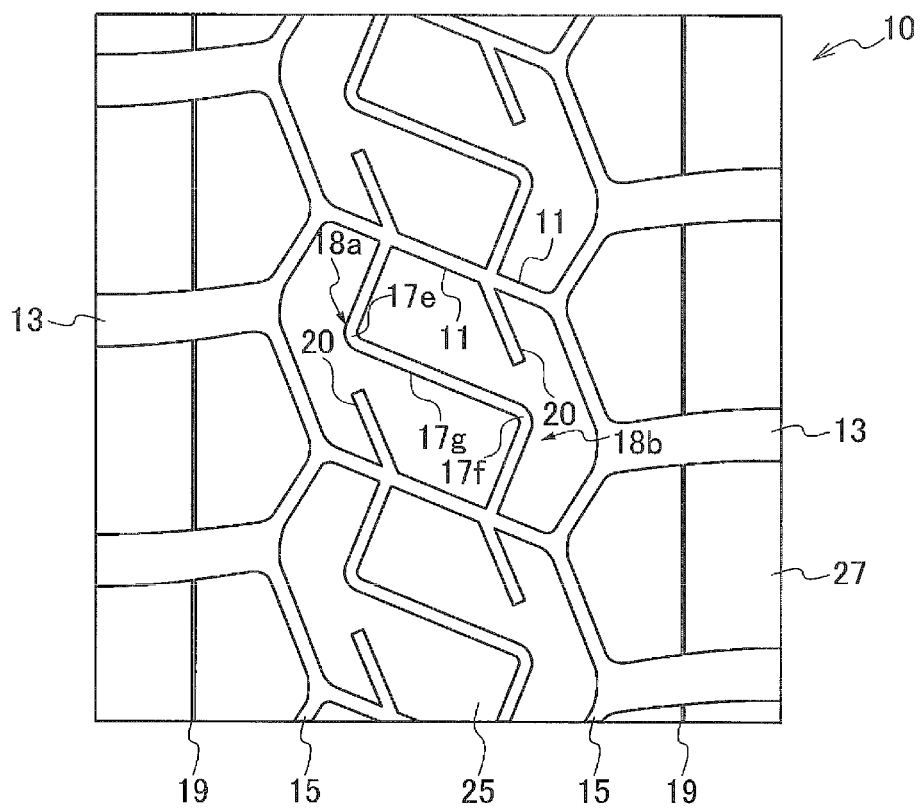
FIG. 13 is a view illustrating a modified example of the tread pattern illustrated in FIG. 8.

The first central narrow groove 20 illustrated in FIG. 8 extends through the region of the center block 23. The first central narrow groove 20 has a first end 20b that opens in either the circumferential main groove 15 or center lug groove 11, and a second end 20a that closes in the center block 23. The second end 20a of the first central narrow groove 20 is closed, and therefore, the center block 23 has sufficient rigidity, and thus uneven wear can be suppressed from occurring, and the first end 20b is opened in another groove adjacent to the center block 23, and therefore, an air passage is formed, and thus heat build-up resistance is improved. Therefore, both heat build-up resistance and uneven wear resistance can be achieved. Note that the first end 20b of the first central narrow groove 20 is opened in the circumferential main groove 15 in an example illustrated in FIG. 8, but may be opened in the center lug groove 11 as illustrated in FIG. 13, according to one embodiment. Furthermore, the groove width of the first central narrow groove 20 is narrower than the groove width of the shoulder lug groove 13. FIG. 13 is a developed plan view illustrating a modified example of the tread pattern illustrated in FIG. 8. A total of two first central narrow grooves 20 are disposed in the region of the center block 23 in the example illustrated in FIG. 8, but according to one embodiment, one or a total of three or more grooves are provided in the region of the center block 23.

Note that in the example illustrated in FIG. 8, the first central narrow groove 20 has one first end 20b that opens in the circumferential main groove 15 in each of the half tread regions Ta, Tb, and extends to and is closed in another half tread region while intersecting the tire equator line CL, from the first end 20b. Furthermore, the first central narrow groove 20 extends in a parallel manner with a middle region 17g described later of the center lug groove 11 and second central narrow groove 17 in the example illustrated in FIG. 8, but according to one embodiment, the groove does not extend in a parallel manner with the grooves. Furthermore, the first central narrow groove 20 has a linear shape in the example illustrated in FIG. 8, but according to one embodiment, the groove has the same groove turning portions as the first groove turning portion 15a and second groove turning portion 15b of the circumferential main groove 15. Furthermore, the first central narrow groove 20 is disposed in the regions 21, 22 dividing the center block 23 in two in the example illustrated in FIG. 8, but according to one embodiment, the first central narrow groove 20 is disposed only in one of the regions 21, 22. Furthermore, in the example illustrated in FIG. 8, an imaginary straight line that connects first ends 20b of two first central narrow grooves 20 is inclined on a side that is different from a first side in the tire lateral direction where the center block 23 is inclined with respect to the tire equator line CL, but inclines to the same side.

The second central narrow groove 17 extends through the inside of the region of the center block 23. Therefore, the center block 23 divides the region of the center block 23 into the two regions 21, 22 while sandwiching the second central narrow groove 17. The second central narrow groove 17 has the opening ends 17a, 17b that open in adjacent center lug grooves 11. Both ends of the second central narrow groove 17 open in the center lug groove 11, and therefore, the passage of air in the center region (region interposed between the pair of circumferential main grooves 15) is favorable, and heat build-up resistance is improved. Note that for the second central narrow groove 17, the opening ends 17a, 17b are positioned at a tire lateral direction position which does not include the tire equator line CL in the example illustrated in FIG. 8, but according to one embodiment, at least one from the opening end 17a and opening end 17b is positioned on the tire equator line CL. For the second central narrow groove 17, the opening end 17a and opening end 17b are positioned in mutually different half tread regions, and intersect the tire equator line CL in the example illustrated in FIG. 8, but according to one embodiment, the opening end 17a and opening end 17b may be positioned in the same half tread region or on the tire equator line CL, and not intersect the tire equator line CL. Note that if the opening ends 17a, 17b are positioned at a tire lateral direction position that does not include the tire equator line CL, and the second central narrow groove 17 does not have a linear shape, the second central narrow groove 17 has a sufficient groove volume, and thus heat build-up resistance can be improved.

If the opening end 17a and opening end 17b are positioned in mutually different half tread regions, according to one embodiment, the opening end 17a and opening end 17b of both sides in the tire lateral direction are positioned at the same side as a side in the tire lateral direction where the center block 23 is inclined with respect to the tire equator line CL, such that an imaginary straight line that connects the opening ends 17a and opening end 17b is also inclined with respect to the tire equator line CL. As with the example illustrated in FIG. 8, the opening end 17a is preferably positioned in the half tread region Ta and the opening end 17b is preferably positioned in the half tread region Tb, as compared to a form where the opening end 17a is positioned in the half tread region Tb and the opening end 17b is positioned in the half tread region Ta. Thereby, the second central narrow groove 17 has a sufficient groove volume, and thus heat build-up resistance can be improved.

The groove width of the second central narrow groove 17 is narrower than the groove width of the shoulder lug groove 13.

Note that in the example illustrated in FIG. 8, the second central narrow groove 17 has: a portion 17c extending outward in the tire lateral direction from the opening end 17a, in the half tread region Ta where the opening end 17a is positioned; and a portion 17d extending outward in the tire lateral direction from the opening end 17b, in the half treat region Tb where the opening end 17b is positioned, but according to one embodiment, the portions extend in the tire circumferential direction from the opening ends 17a, 17b. Furthermore, according to another embodiment, the portions extend from the opening ends 17a, 17b so as to approach or connect with the tire equator line CL. Due to the second central narrow groove 17 providing the portions 17c, 17d, the ground contact pressure fluctuates at the same position in the tire lateral direction in accordance with a rotation when the tire 1 rotates, and therefore, stress concentration at a specific position in the center block 23 can be avoided. More specifically, if a portion that does not contact a road surface when the tire 1 rotates is always in the same position in the tire lateral direction, in other words, if a position that does not contact a road surface does not fluctuate in the tire lateral direction as with a linear shaped groove extending in the tire circumferential direction, stress is concentrated at the position, and early wear easily occurs, but due to the portions 17c, 17d extending outward in the tire lateral direction, a portion of the groove not contacting a road surface during tire rotation fluctuates in the tire circumferential direction, and thus a position on which stress is concentrated can be dispersed. In particular, the portions 17c, 17d extend outward in the tire lateral direction so as to be away from the tire equator line CL, and therefore, during tire rotation, a portion not contacting a road surface as with a portion of the groove can fluctuation across a wide range in the tire lateral direction.

Note that the groove widths of the first central narrow groove 20 and second central narrow groove 17 may be equal or may be different.

Furthermore, the first central narrow groove 20 is not connected with the second central narrow groove 17 in the example illustrated in FIG. 8, but may be connected with the second central narrow groove 17 according to one embodiment. In this case, if a plurality of the first central narrow groove 20 are present, the first central narrow groove 20 may be mutually connected. Furthermore, according to one embodiment, the first central narrow groove 20 the second central narrow groove 17 are formed so as to extend continuously such that the center lug groove 11 and the first central narrow groove 20 or second central narrow groove 17 of the adjacent center block 23 are sandwiched.

According to one embodiment, in the tire 1, a maximum groove depth of the circumferential main groove 15 is preferably shallower than a maximum groove depth of the center lug groove 11, and the maximum groove depth of the center lug groove 11 is preferably shallower than a maximum depth of the shoulder lug groove 13. Based on this groove depth order, the circumferential main groove 15 and center lug groove 11 disappear in order from a tread surface and the shoulder lug groove 13 remains to the end in conjuction with wearing of the tire 1. A center region in a tread portion provided with the tread rubber 6 has high ground contact pressure, and heat easily builds up due to the center block 23 repeatedly deforming. Therefore, in order to improve the heat build-up resistance, a maximum groove depth of the center lug groove 11 is preferably larger than a maximum groove depth of the circumferential main groove 15. Furthermore, when the maximum groove depth of the circumferential main groove 15 is too large, the tread rubber 6 may not have sufficient rigidity, and the wear life may be reduced, and therefore, the maximum groove depth of the circumferential main groove 15 is preferably shallower than the maximum groove depth of the center lug groove 11. Note that "maximum groove depth" refers to a maximum groove depth if a groove depth in a direction in which a groove extends is not constant, and refers to a groove depth if a groove depth in a direction in which a groove extends constant. For example, if the circumferential main groove 15 is provided with the same raised bottom portion 15c as the raised bottom portion 15c (refer to FIG. 5) in the tire of the first embodiment described above, the maximum groove depth is a groove depth of a portion of the circumferential main groove 15 where a bottom is not raised.

Figure 10A:
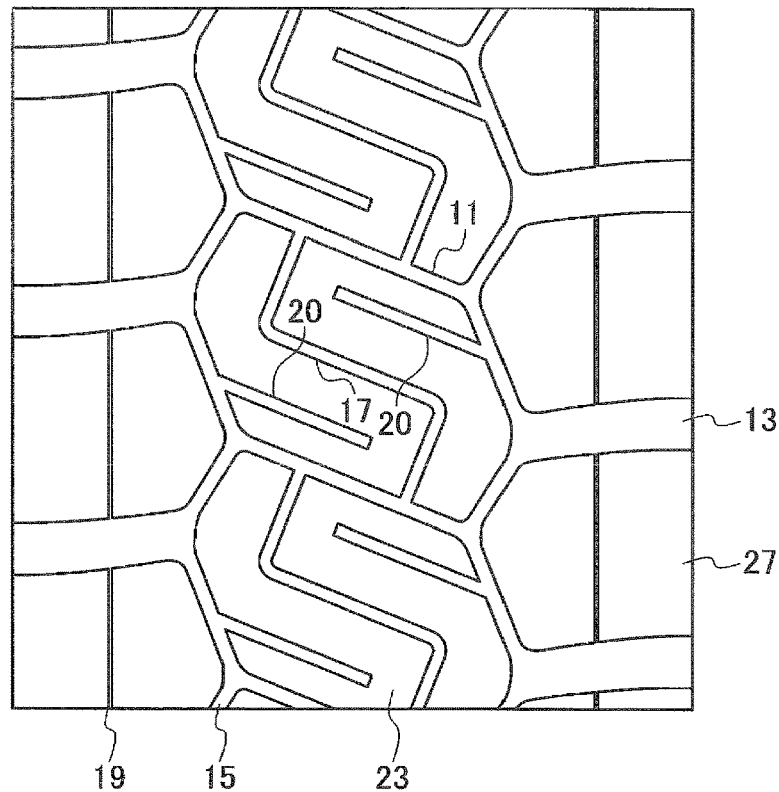
FIG. 10A is a view illustrating an example of the tread pattern of a heavy duty pneumatic tire illustrated in FIG. 8 in an early stage of wear.
Figure 10B:
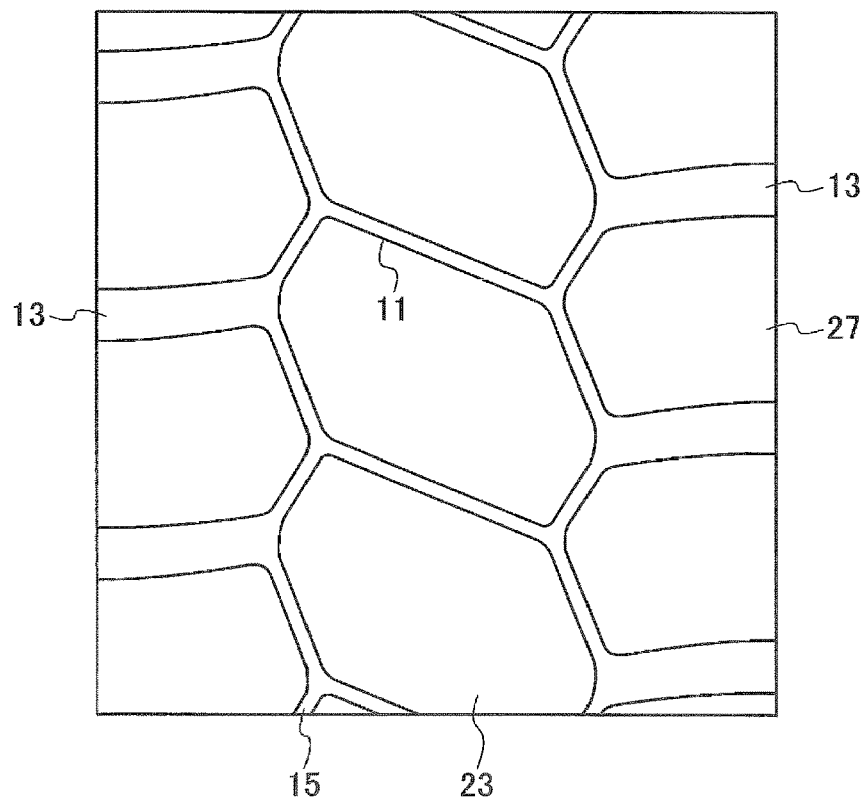
FIG. 10B is a view illustrating an example of the tread pattern of a heavy duty pneumatic tire illustrated in FIG. 8 where wearing has further advanced.

According to one embodiment, in the tire 1, the maximum groove depths of the first central narrow groove 20 and second central narrow groove 17 are preferably shallower than a maximum groove depth of the circumferential main groove 15. By the maximum groove depth being shallower than the maximum depth of the circumferential main groove 15, when the tire 1 is worn, first central narrow groove 20 and second the central narrow groove 17 disappear faster than the circumferential main grooves 15 as illustrated in FIG. 10B. FIG. 10B is a view illustrating the tire where wear has advanced more than the early stages of wear. FIG. 10A is a view illustrating a tread pattern of the tire in the early stages of wear. "The early stages of wear" refers to a stage of wear of the tire 1 where a groove with a shallowest groove depth has still not disappeared, which includes when the tire 1 is new.

According to one embodiment, when the maximum groove depth of the first central narrow groove 20 and second central narrow groove 17 is set to D1 (refer to FIG. 9) and the maximum groove depth of the circumferential main groove 15 is set to D2 (refer to FIG. 9) for the tire 1, the ratio D1/D2 is more preferably 0.05 to 0.2. When the ratio D1/D2 exceeds 0.2, the rigidity of the center block 23 may be reduced and thus uneven wear may easily occur, and the amount of rubber in the center block 23 may be insufficient and thus wear resistance may be reduced. Furthermore, if the ratio D1/D2 is lower than 0.05, the first central narrow groove 20 and second central narrow groove 17 at the early stages of wear does not sufficiently function as a passage for air, and thus heat build-up resistance is difficult to improve. The ratio D1/D2 is more preferably 0.1 to 0.2. Note that "groove depth" for the grooves included in the tread pattern 10 simply refers to as the maximum groove depth. Furthermore, in a cross section cut by line I-I, a portion where the raised bottom portion 15c described above is positioned is expressed in the circumferential main groove 15, but for convenience of description, maximum groove depth D2 of the circumferential main groove 15 is illustrated in place of groove depth D3 (refer to FIG. 5) of the raised bottom portion 15c in FIG. 9.

The maximum groove depths of the first central narrow groove 20 and second central narrow groove 17 are mutually equal in the example illustrated in FIG. 9, but may be mutually different.

Figure 11:
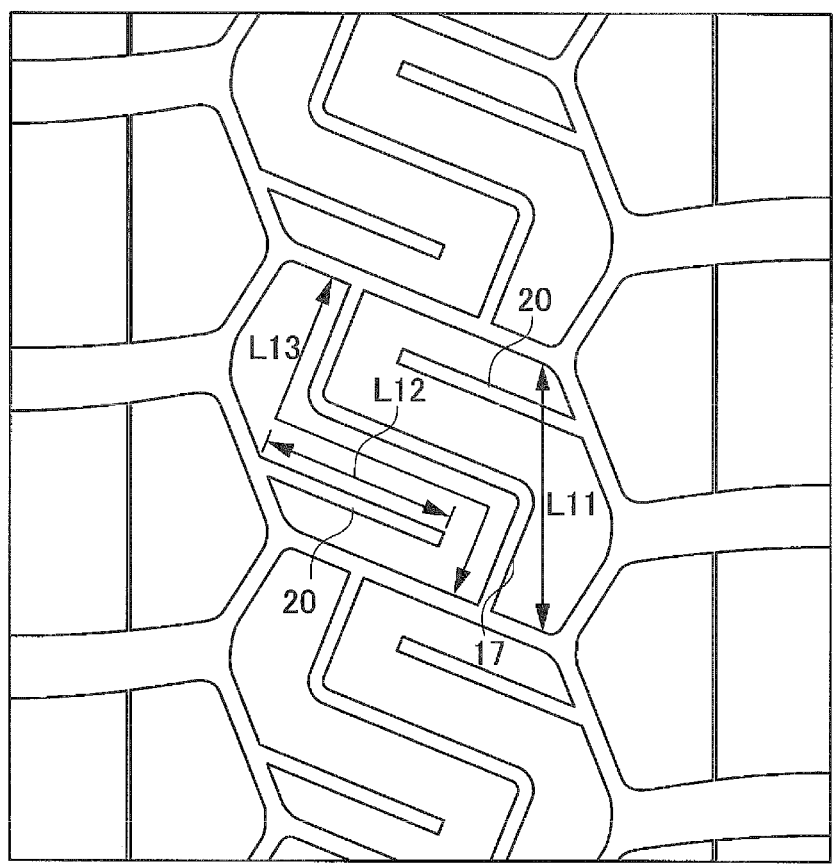
FIG. 11 is an enlarged view of the tread pattern of a heavy duty pneumatic tire illustrated in FIG. 8.

According to one embodiment, as illustrated in FIG. 11, if a tire circumferential direction length of the center block 23 is L11, and the groove length of the first central narrow groove is L12, the ratio L11/L12 is preferably 0.4 to 0.9 in the tire 1. If the ratio L11/L12 is 0.4 or higher, the first central narrow groove 20 has sufficient groove volume in the region of the center block 23, and thus heat build-up resistance is improved. FIG. 11 is an enlarged view of the tread pattern of a heavy duty pneumatic tire illustrated in FIG. 8. Furthermore, if the ratio L11/L12 is 0.9 or lower, the center block 23 has sufficient rigidity, and thus reduction of uneven wear resistance can be suppressed. The ratio L11/L12 is more preferably 0.5 to 0.8.

According to one embodiment, as illustrated in FIG. 11, the tread pattern 10 includes an N number (N is a natural number) of the first central narrow grooves 20 with a groove length that is L12, as the plurality of first central narrow grooves 20, and if the tire circumferential direction length of the center block 23 is L11, the ratio L11/(N×L12) is preferably 0.8 to 3.0, in the tire 1. If the ratio L11/(N×L12) is lower than 0.8, the block rigidity is reduced, and thus early wear due to uneven wear occurs. If the ratio L11/(N×L12) exceeds 3.0, the groove volume inside the center block 23 is not sufficient, and thus heat build-up resistance does not improve. The ratio L11/(N×L12) is more preferably 0.9 to 2.9. Note that the groove lengths L12 of the first central narrow grooves 20 are mutually equal in an example illustrated in FIG. 11, but may be different. Even if L12 is mutually different, the range of the aforementioned ratio is preferably satisfied. Furthermore, the number of N may be 3 or higher.

According to one embodiment, in the tire 1, if a groove length of the second central narrow groove 17 is set to L13 and a tire circumferential direction length of the center block 23 is set to L11 as illustrated in FIG. 11, the ratio L13/L11 is preferably 1.8 to 2.2. FIG. 11 illustrates the same tread pattern as FIG. 8. Note that in the example illustrated in FIG. 11, L11 is constant in the same tire lateral direction region as the tire lateral direction where the center lug groove 11 is positioned, but a case where adjacent center lug grooves 11 are not parallel with each other, and the tire circumferential direction length of the center block 23 changes in the tire lateral direction is referred to as a maximum length. If the ratio L13/L11 exceeds 1.8, the region of the center block 23 has a sufficient groove volume, and thus heat build-up resistance can be improved. On the other hand, if the maximum groove depth of the second central narrow groove 17 is shallower than the maximum groove depth of the circumferential main groove 15 even if the ratio L13/L11 exceeds 1.8, the second central narrow groove 17 disappears in the relatively early stage due to the aforementioned wear, and therefore, the reduction of the rigidity of the center block 23 is suppressed. In other words, if heat build-up resistance in the early stages of wear due to the ratio L13/L11 exceeding 1.8 and if the maximum groove depth of the second central narrow groove 17 is shallower than the maximum groove depth of the circumferential main groove 15, wear life can be extended. If the ratio L13/L11 is 1.8 or lower, the second central narrow groove 17 is less likely to sufficiently function as an air passage. Furthermore, if the ratio L13/L11 is 2.2 or lower, uneven wear due to reduced rigidity of the center block 23 can be suppressed from occurring. If the ratio L13/L11 exceeds 2.2, the rigidity of the center block 23 may be reduced, and thus uneven wear may occur. The ratio L13/L11 is more preferably 1.9 to 2.1.

According to one embodiment, the second central narrow groove 17 of the tire 1 preferably has one turning out portion 18a or 18b extending so as to protrude outward in the tire lateral direction with regard to the tire equator line CL, in each of the half tread regions Ta, Tb. The turning out portions 18a, 18b are portions that are bent due to the direction of the groove changing on the tread surface of the second central narrow grooves 17, and specifically may be a bent shape, a rounded curved shape, or a combination of a bent shape and curved shape. The curved shape also includes shapes where the entire turning out portions 18a, 18b are rounded by setting a radius of curvature, and shapes where apex portions 17e, 17f (refer to FIG. 8) with a bent shape are rounded by setting a radius of curvature, for example, as with the example illustrated in FIG. 8. "A combination of a bent shape and curved shape" refers to a first side of the apex portions 17e, 17f of the turning out portions 18a, 18b extending in a linear shape, and a second side extending in a curved manner from the apex portions 17e, 17f. Of the bent shape, curved shape, or combination thereof, the turning out portions 18a, 18b may use the same shape as each other, or may use various mutually different shapes. Furthermore, portions other than the turning out portions 18a, 18b of the second central narrow grooves 17 may have a linear shape or a curved shape. In the example illustrated in FIG. 8, portions other than the turning out portions 18a, 18b have a linear shape. If the turning out portions 18a, 18b and portions other than the turning out portions 18a, 18b both have a curved shape, the two curved shapes may be a curved shape with the same radius of curvature.

Note that in the example illustrated in FIG. 8, the turning out portion 18a and turning out portion 18b are connected through a middle region 17g extending in a linear shape, so as to intersect the tire equator line CL.

The second central narrow groove 17 has the turning out portions 18a, 18b, and therefore, the block rigidity of regions 21, 22 divided in two by the second central narrow groove 17 is appropriate, and thus uneven wear is suppressed from occurring. Furthermore, the region of the center block 23 has a sufficient groove volume, and thus heat build-up resistance is improved. If only one turning out portion is disposed in the second central narrow groove 17, or if the turning out portion is disposed in only one half tread region, a bias in block rigidity occurs, and thus uneven wear is prone to occur.

Figure 12:
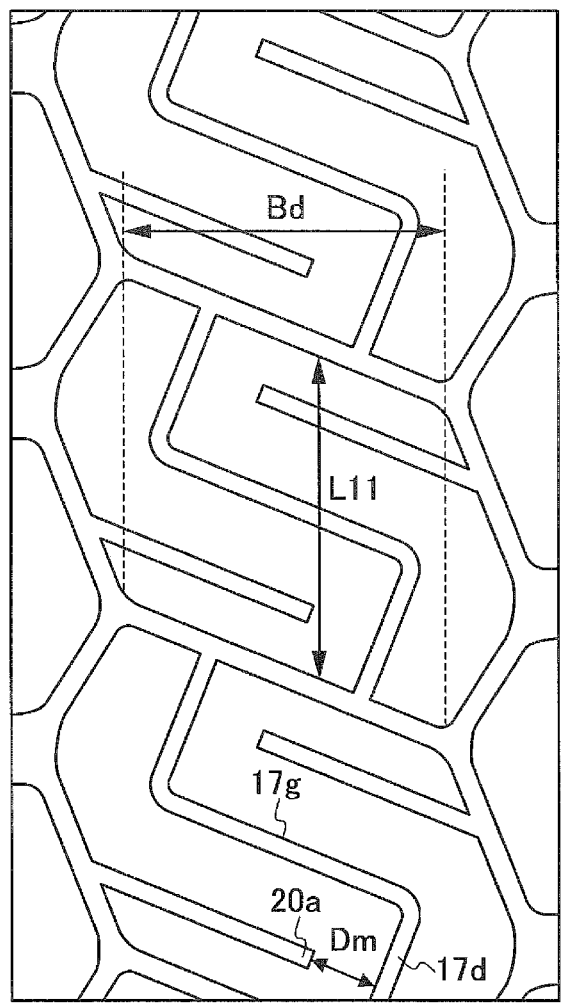
FIG. 12 is an enlarged view of the tread pattern of a heavy duty pneumatic tire illustrated in FIG. 8.

According to one embodiment, as illustrated in FIG. 12, if a shortest distance between the first center block 20 and second central narrow groove 17 in the center block 23 is Dm, the tire circumferential direction length of the center block 23 is L11, and a length of a region in the tire lateral direction occupied by at least one from the center block 23 and center lug groove 11 over a tire circumferential direction is Bd, the ratio of Dm to the shorter of L11 and Bd is preferably 0.1 or higher, in the tire 1. FIG. 12 is an enlarged view of the tread pattern of a heavy duty pneumatic tire illustrated in FIG. 8. If the ratio is 0.1 or higher, the first central narrow groove 20 and second central narrow groove 17 do not approach too closely to each other, and a region where rigidity of the center block 23 is locally reduced can be avoided from occurring, and thus uneven wear can be suppressed from occurring. In the example illustrated in FIG. 12, Dm is the shortest distance between the end 20a that closes the first central narrow groove 20 and the portion 17d of the second central narrow grooves 17, but is not limited thereto, and may be the distance between the middle region 17g of the second central narrow groove 17 and first central narrow groove 20, that extend parallel to each other, for example. The ratio of Dm to the shorter of L11 and Bd is more preferably 0.15 or higher.

According to one embodiment, as illustrated in FIG. 8, the tread pattern 10 of the tire 1 preferably includes a shoulder narrow groove 19 extending in a region of the shoulder block 27, opening in adjacent shoulder lug grooves 13, and having a groove width that is narrower than the groove width of the shoulder lug groove 13, in the half tread regions Ta, Tb. The shoulder narrow groove 19 where both ends open in the shoulder lug groove 13 is provided in the region of the shoulder block 27, and therefore, the surface area of the tread rubber 6 is increased, and the passage of air is favorable, and thus heat build-up resistance is improved. Furthermore, the groove width of the shoulder narrow groove 19 is narrower than the groove width of the shoulder lug groove 13. Note that the shoulder block 27 includes two regions 25, 26 divided in two by the shoulder narrow groove 19.

The shoulder narrow groove 19 has a linear shape, but may not have a linear shape, and may have the same groove turning portion as the groove turning portions 15a, 15b of the circumferential main groove 15, for example. The shoulder narrow groove 19 extends in the tire circumferential direction in the example illustrated in FIG. 8, but extends in an inclined manner with respect to the tire circumferential direction according to one embodiment. As illustrated in FIG. 8, adjacent shoulder narrow grooves 19 that are adjacent in the tire circumferential direction are connected at the same position in the tire lateral direction to the shoulder lug groove 13, but are connected at a different position in the tire lateral direction according to one embodiment.

According to one embodiment, if the length of the shoulder narrow groove 19 is L14, and the minimum length in a tire circumferential direction of the shoulder block is L15, the ratio L14/L15 is preferably 1.0 to 1.2, in the tire 1. If the ratio L14/L15 is 1.0 or higher, the shoulder narrow groove 19 opens in both adjacent shoulder lug grooves 13 at least at a position where L15 is minimum. Furthermore, if the ratio L14/L15 is 1.2 or lower, uneven wear due to reduced block rigidity of the shoulder block 27 can be suppressed. Note that the length in the tire circumferential direction of the shoulder block 27 may be constant in the tire lateral direction, or may not be constant as with the example illustrated in FIG. 8. Note that in the example illustrated in FIG. 8, L15 is a tire circumferential direction length at a tire lateral direction position where the tire circumferential direction length is minimal in the shoulder block 27.

According to one embodiment, in the tire 1, the tread pattern 10 of the tire 1 is preferably point symmetrical with a center point P (refer to FIG. 8) in a tread surface of the center block 23. The tread pattern 10 has such a form, and therefore, rigidity is uniform on both side in the tire lateral direction, and thus uneven wear can be suppressed. If the pattern is not point symmetrical, a bias in rigidity occurs, and thus uneven wear is prone to occur. Note that in the tread pattern 10, the center blocks 23 have the same shape in the center block example.

According to one embodiment, the groove widths of the circumferential main grooves 15 and the plurality of center lug grooves 11 are preferably 7 mm to 20 mm in the tire 1. The size of the groove widths of the circumferential main groove 15 and center lug groove 11 is 18 mm, for example. Note that when the groove widths of the circumferential main groove 15 and center lug groove 11 are within the aforementioned range, the tire 1 can be appropriately used as an off-road tire. In this case, the groove widths of the second central narrow groove 17 and shoulder narrow groove 19 are preferably 7 to 20 mm.

According to one embodiment, the tire 1 is suitably mounted on a construction vehicle or industrial vehicle. Examples of construction vehicles and industrial vehicles include a dump truck, scraper, grader, shovel loader, tire roller, wheel crane, truck crane as described in JATMA, as well as a compactor, earth mover, grader, loader, and dozer as described in TMA, and other vehicles.

Figure 14:
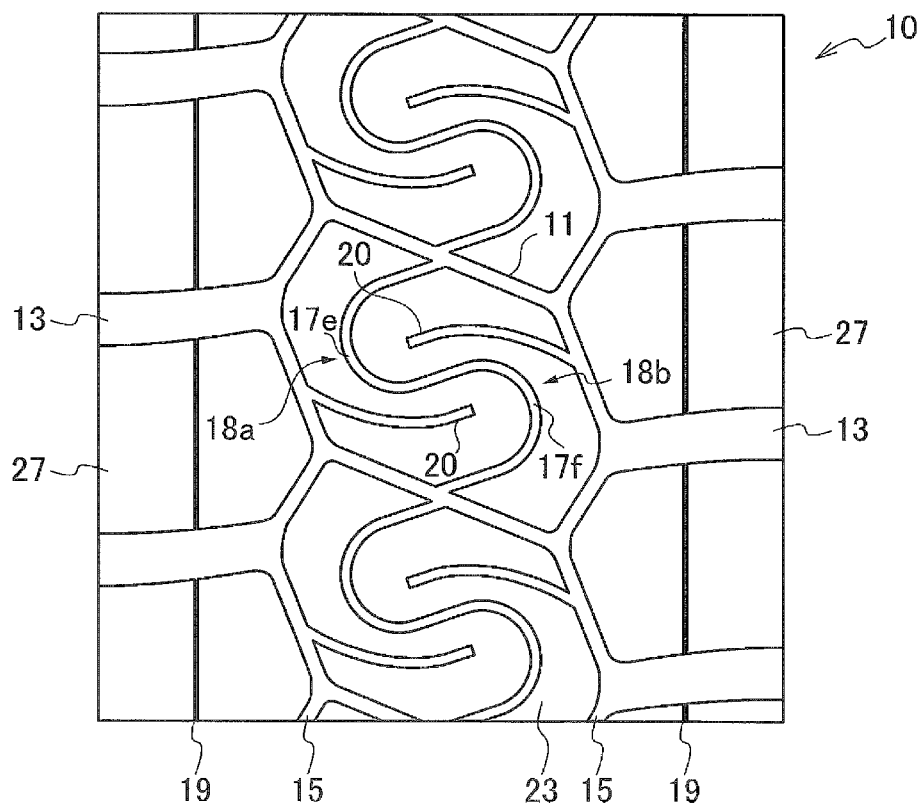
FIG. 14 is a view illustrating another modified example of the tread pattern illustrated in FIG. 8.

The tire 1 may have a tread pattern 10 illustrated in FIG. 13 or FIG. 14 in addition to the example illustrated in FIG. 8, as modified examples. FIG. 13 and FIG. 14 are both views illustrating modified examples of the tread pattern illustrated in FIG. 8. In FIG. 13 and FIG. 14, the same reference sign as those used in FIG. 8 are used on elements corresponding to the elements included in the tread pattern 10 illustrated in FIG. 8.

A first central narrow groove 20 illustrated in FIG. 13 extends from the center lug groove 11, and closes in a region of the center block 23.

A first central narrow groove 20 illustrated in FIG. 14 extends from a circumferential main groove 15 to form a curved shape that matches the curved shape of the second central narrow groove 17.

According to the heavy duty pneumatic tire 1 of the second embodiment described above, the center lug groove 11 has a linear shape, and therefore, the block rigidity of adjacent center blocks 23 in the tire circumferential direction is uniform, and thus uneven wear can be suppressed. Furthermore, the second central narrow groove 17 that opens in adjacent center lug grooves 11 is provided, and therefore, the passage of air in a center region is favorable, and thus the heat build-up resistance is improved. Furthermore, the second end 20a of the first central narrow groove 20 is closed, and therefore, the rigidity of the center block 23 can be ensured, and thus uneven wear can be suppressed from occurring, and the first end 20b is opened in another groove adjacent to the center block 23, and therefore, an air passage is formed, and thus heat build-up resistance is improved. Therefore, both heat build-up resistance and uneven wear resistance can be achieved.

If the maximum groove depth of the circumferential main groove 15 is shallower than the maximum groove depth of the center lug groove 11, and the maximum groove depth of the center lug groove 11 is shallower than the maximum groove depth of the shoulder lug groove 13, the heat build-up resistance can be improved, and the tread rubber 6 can have sufficient rigidity, thereby extending the wear life.

If the ratio D1/D2 is 0.2 or lower, the center block 23 has a sufficient amount of rubber, and thus reduction of the wear resistance can be suppressed in conjunction with suppressing rigidity reduction of the center block 23 and suppressing uneven wear from occurring. Furthermore, if the ratio D1/D2 is 0.05 or higher, the second central narrow groove 17 at the early stages of wear sufficiently functions as a passage for air, and thus heat build-up resistance is improved.

If the ratio L11/L12 is 0.4 or higher, the first central narrow groove 20 has sufficient groove volume in the region of the center block 23, and thus heat build-up resistance is improved. Furthermore, if the ratio L11/L12 is 0.9 or lower, the center block 23 has sufficient rigidity, and thus reduction of uneven wear resistance can be suppressed.

The ratio L11/(N×L12) is preferably 0.8 to 3.0. If the ratio L11/(N×L12) is lower than 0.8, the block rigidity is reduced, and thus early wear due to uneven wear occurs. If the ratio L11/(N×L12) exceeds 3.0, the center block 23 does not have a sufficient groove volume, and thus heat build-up resistance does not improve.

If the ratio L13/L11 exceeds 1.8, the region of the center block 23 has a sufficient groove volume, and thus heat build-up resistance can be improved. On the other hand, if the maximum groove depth of the second central narrow groove 17 is shallower than the maximum groove depth of the circumferential main groove 15 even if the ratio L13/L11 exceeds 1.8, the second central narrow groove 17 disappears in the relatively early stage due to wear, and therefore, the reduction of the rigidity of the center block 23 is suppressed. In other words, if heat build-up resistance in the early stages of wear due to the ratio L13/L11 exceeding 1.8 and if the maximum groove depth of the second central narrow groove 17 is shallower than the maximum groove depth of the circumferential main groove 15, wear life can be extended. If the ratio L13/L11 is 1.8 or lower, the second central narrow groove 17 is less likely to sufficiently function as an air passage. Furthermore, if the ratio L13/L11 is 2.2 or lower, uneven wear due to reduced rigidity of the center block 23 can be suppressed from occurring.

If the circumferential main grooves 15 are provided with the raised bottom portion 15c where the groove is partially shallow, the adjacent center block 23 and shoulder block 27 support each other to suppress collapsing of the blocks, and thus block rigidity is an appropriate level. Thereby, early wear due to uneven wear can be suppressed.

The second central narrow groove 17 has the turning out portions 18a, 18b, and therefore, the block rigidity of regions 21, 22 divided in two by the second central narrow groove 17 is appropriate, and thus uneven wear is suppressed from occurring. Furthermore, the region of the center block 23 has a sufficient groove volume, and thus heat build-up resistance is improved.

If the ratio of Dm to the shorter of L11 and Bd is 0.1 or higher, the first central narrow groove 20 and second central narrow groove 17 do not approach too closely to each other, and a region where rigidity of the center block 23 is locally reduced can be avoided from occurring, and thus uneven wear can be suppressed from occurring.

If the tread pattern 10 includes the shoulder narrow groove 19, the surface area of the tread rubber 6 is increased, and the passage of air is favorable, and thus the heat build-up resistance is improved.

If the ratio L14/L15 is 1.0 or higher, the shoulder narrow groove 19 opens in both adjacent shoulder lug grooves 13 at least at a position where L15 is minimum. Furthermore, if the ratio L14/L15 is 1.2 or lower, uneven wear due to reduced block rigidity of the shoulder block 27 can be suppressed.

The tires 1 of the first embodiment and second embodiment were described above. In the tires 1 of both the first embodiment and second embodiment, the circumferential main grooves 15 are provided with the raised bottom portion 15c where the groove is partially shallow, and therefore, the adjacent center block 23 and shoulder block 27 support each other to suppress collapsing of the blocks. In other words, the block rigidity is an appropriate level, and therefore, early wear due to uneven wear can be suppressed.

For the tires 1 of both the first embodiment and second embodiment, if the ratio D3/T is 0.05 or lower, the block rigidity is a more appropriate level due to the center block 23 and shoulder block 27 supporting each other, and thus early wear due to uneven wear can be suppressed. Furthermore, if the ratio D3/T is 0.01 or higher, the passage of air in the groove can be prevented from deteriorating.

The tires 1 of both the first embodiment and second embodiment are point symmetrical with respect to the center point P on a tread surface of the center block 23, and therefore, the rigidity of the tread rubber 6 is uniform on both sides in the tire lateral direction, and thus uneven wear can be suppressed.

For the tires 1 of both the first embodiment and second embodiment, the groove widths of the circumferential main groove 15 and center lug groove 11 are 7 mm to 20 mm, and therefore, the tire can be suitably used as an off-road tire.

For both the tires 1 of the first embodiment and second embodiment, the tire 1 can be preferably mounted to a construction vehicle or industrial vehicle.

Experiment 1: Tire of First Embodiment

Various tires of the first embodiment with different tread patterns as shown in Tables 1 to 4 were fabricated (Examples 1 to 14, Comparative Examples 1 and 2), and the uneven wear resistance and heat build-up resistance in a tread center region were examined. The tires were prepared in accordance with the specifications shown in Tables 1 to 4 based on the tread pattern illustrated in FIG. 2.

The size of the prototype tires is 33.00R51. After mounting to a rim with a 51×24-5.0 size, a heat build-up resistance test and uneven wear resistance test were performed with test conditions set at 700 kPa (TRA standard maximum air pressure).

Heat Build-Up Resistance

A prototype tire was attached to an indoor drum testing machine, and driven at a speed of 5 km/hour under a 110% load of the TRA standard maximum load (38750 kg), with the speed increased by 1 km/hour every 12 hours, and the travel time until the tire failed was measured. The results are shown as index values with the value of Comparative Example 1 expressed as 100. A higher index value indicates superior heat build-up resistance.

Uneven Wear Resistance

A prototype tire was mounted to an actual vehicle, and a traveling test on an off-road surface in a mine under a test condition of a TRA standard maximum load (38750 kg) was performed, the degree of uneven wear produced when traveling for the same amount of time of 3000 hours or more was observed and expressed as an index value with Comparative Example 1 set as 100. For uneven wear, a maximum step in the tire circumferential direction generated on the tread surface was observed. A higher index value indicates superior uneven wear resistance.

As a result of the above, cases where the index values of the heat build-up resistance and uneven wear resistance was 100 or higher for all tires, and the total index value of 205 or higher were evaluated as having both the heat build-up resistance and uneven wear resistance achieved.

TABLE 1

|  | Comparative Example 1 | Comparative Example 2 | Example 1 |
|---|---|---|---|
| Presence of circumferential main grooves | Present | Present | Present |
| Whether or not center lug groove has a linear shape | Linear shape | Linear shape | Linear shape |
| Presence of central narrow groove opening in adjacent center lug grooves | Absent | Present | Present |
| Presence of portion of central narrow groove extending outwards in a width direction from opening end | Absent | Absent | Present |
| D1/D2 | — | 0.3 | 0.3 |
| L1/L2 | — | 1.7 | 1.7 |
| D3/T | 0.06 | 0.06 | 0.06 |
| Whether or not central narrow groove has turning out portion in each half tread region | — | Absent | Absent |
| L3/L4 | 1.3 | 1.3 | 1.3 |
| Pattern symmetry | Point asymmetrical | Point asymmetrical | Point asymmetrical |
| Uneven wear resistance | 100 | 101 | 102 |
| Heat build-up resistance | 100 | 102 | 104 |

As shown in Table 1, if a pair of circumferential main grooves were provided, a center lug groove with a linear shape was provided, and a central narrow groove that opens in adjacent center lug grooves was provided, and the central narrow groove has a portion that extends outward in a tire lateral direction from an opening end thereof (Example 1), heat build-up resistance and uneven wear resistance were both achieved. In contrast, if the central narrow groove did not have a portion extending outward in a tire lateral direction from an opening end thereof (Comparative Example 2), heat build-up resistance and uneven wear resistance did not sufficiently improve. Note that an embodiment where a central narrow groove extends in a tire circumferential direction from an opening end thereof was used as an embodiment where a central narrow groove does not have a portion extending in a tire lateral direction of an opening end thereof.

Note that an embodiment where a central narrow groove is open on only one of the adjacent center lug grooves was used as a form of Comparative Example 1 where the central narrow groove that opens in adjacent center lug grooves is not provided.

TABLE 2

|  | Example 2 | Example 3 | Example 4 | Example 5 | Example 6 | Example 7 |
| --- | --- | --- | --- | --- | --- | --- |
| Presence of circumferential main grooves | Present | Present | Present | Present | Present | Present |
| Whether or not center lug groove has a linear shape | Linear shape | Linear shape | Linear shape | Linear shape | Linear shape | Linear shape |
| Whether or not central narrow groove opens in adjacent center lug grooves | Present | Absent | Present | Present | Present | Present |
| Presence of portion of central narrow groove extending outwards in a width direction from opening end | Present | Present | Present | Present | Present | Present |
| $D1/D2$ | 0.2 | 0.1 | 0.2 | 0.2 | 0.2 | 0.2 |
| $L1/L2$ | 1.7 | 1.7 | 1.9 | 2.0 | 2.1 | 2.3 |
| $D3/T$ | 0.06 | 0.06 | 0.06 | 0.06 | 0.06 | 0.06 |
| Whether or not central narrow groove has turning out portion in each half tread region | Absent | Absent | Absent | Absent | Absent | Absent |
| $L3/L4$ | 1.3 | 1.3 | 1.3 | 1.3 | 1.3 | 1.3 |
| Pattern symmetry | Point asymmetrical | Point asymmetrical | Point asymmetrical | Point asymmetrical | Point asymmetrical | Point asymmetrical |
| Uneven wear resistance | 104 | 105 | 106 | 107 | 105 | 103 |
| Heat build-up resistance | 104 | 103 | 107 | 110 | 113 | 113 |

As seen in Table 1 and Table 2, if the ratio $D1/D2$ was 0.05 to 0.2 (Examples 2, 3), uneven wear resistance improved as compared to if $D1/D2$ exceeded 0.2 (Example 1).

Furthermore, if the ratio $L1/L2$ was 1.8 to 2.2 (Examples 4 to 6), heat build-up resistance and uneven wear resistance both improved as compared to if $L1/L2$ was lower than 1.8 (Example 2). Furthermore, uneven wear resistance was improved, and balance between heat build-up resistance and uneven wear resistance was excellent, as compared to if $L1/L2$ exceeded 2.2 (Example 7). Note that cases where the difference in index values between the heat build-up resistance and uneven wear resistance within 7 was evaluated as having excellent balance between heat build-up resistance and uneven wear resistance.

TABLE 3

|  | Example 8 | Example 9 | Example 10 | Example 11 | Example 12 | Example 13 |
| --- | --- | --- | --- | --- | --- | --- |
| Presence of circumferential main grooves | Present | Present | Present | Present | Present | Present |
| Whether or not center lug groove has a linear shape | Linear shape | Linear shape | Linear shape | Linear shape | Linear shape | Linear shape |
| Whether or not central narrow groove opens in adjacent center lug grooves | Present | Present | Present | Present | Present | Present |

TABLE 3-continued

| | Example 8 | Example 9 | Example 10 | Example 11 | Example 12 | Example 13 |
|---|---|---|---|---|---|---|
| Presence of portion of central narrow groove extending outwards in a width direction from opening end | Present | Present | Present | Present | Present | Present |
| D1/D2 | 0.2 | 0.2 | 0.2 | 0.2 | 0.2 | 0.2 |
| L1/L2 | 2.0 | 2.0 | 2.0 | 2.0 | 2.0 | 2.0 |
| D3/T | 0.04 | 0.04 | 0.04 | 0.04 | 0.04 | 0.04 |
| Whether or not central narrow groove has turning out portion in each half tread region | Absent | Present | Present | Present | Present | Present |
| L3/L4 | 1.3 | 1.3 | 0.9 | 1.0 | 1.1 | 1.6 |
| Pattern symmetry | Point asymmetrical | Point asymmetrical | Point asymmetrical | Point asymmetrical | Point asymmetrical | Point asymmetrical |
| Uneven wear resistance | 109 | 111 | 113 | 115 | 113 | 110 |
| Heat build-up resistance | 110 | 110 | 115 | 117 | 119 | 119 |

As seen in Table 2 and Table 3, if the ratio D3/T was 0.05 or lower (Example 8), uneven wear resistance greatly improved as compared to if the ratio D3/T exceeded 0.05 (Example 7). Furthermore, if a central narrow groove had a turning out portion in half tread regions (Example 9), uneven wear resistance improved as compared to if the central narrow groove did not have a turning out portion in half tread regions (Example 8). Note that an embodiment having a turning out portion in only one half tread region was used as an embodiment that does not have a turning out portion in the half tread regions.

Furthermore, if the ratio L3/L4 was 1.0 to 1.4 (Examples 11 and 12), uneven wear resistance was excellent, and balance between the heat build-up resistance and uneven wear resistance was excellent, as compared to if the ratio L3/L4 exceeded 1.4 (Example 13).

TABLE 4

| | Example 14 |
|---|---|
| Presence of circumferential main grooves | Present |
| Whether or not center lug groove has a linear shape | Linear shape |
| Whether or not central narrow groove opens in adjacent center lug grooves | Present |
| Presence of portion of central narrow groove extending outwards in a width direction from opening end | Present |
| D1/D2 | 0.2 |
| L1/L2 | 2.0 |
| D3/T | 0.04 |
| Whether or not central narrow groove has turning out portion in each half tread region | Present |
| L3/L4 | 1.0 |
| Pattern symmetry | Point symmetrical |
| Uneven wear resistance | 117 |
| Heat build-up resistance | 117 |

As seen in Table 3 and Table 4, if the tread pattern was point symmetrical (Example 14), heat build-up resistance and uneven wear resistance both improved as compared to if the tread pattern was not point symmetrical (Example 11). Note that an embodiment where the patterns in both half tread regions are mutually different was used as an embodiment where the tread pattern was not point symmetrical.

Experiment 2: Tire of First Embodiment

Various tires of the first embodiment with different tread patterns as shown in Tables 5 to 10 were trial manufactured (Examples 101 to 124, Comparative Examples 101 and 102), and the uneven wear resistance and heat build-up resistance in a tread center region were examined. The tires were prepared in accordance with the specifications shown in Tables 5 to 10 based on the tread pattern illustrated in FIG. 8.

The size of the prototype tires is the same size as the tires in the first embodiment of Experiment 1. The same heat build-up resistance test and uneven wear resistance test were performed under the same conditions as Experiment 1 for evaluations. In this case, cases where the index values of the heat build-up resistance and uneven wear resistance was 100 or higher for all tires, and the total index value of 206 or higher were evaluated as having both the heat build-up resistance and uneven wear resistance achieved.

Note that in Tables 5 to 10, the ratio "Dm/(Bd or L11)" expresses the ratio of Dm to the shorter of Bd and L11 described above.

TABLE 5

| | Comparative Example 101 | Comparative Example 102 | Example 101 |
|---|---|---|---|
| Presence of circumferential main grooves | Present | Present | Present |
| Whether or not center lug groove has a linear shape | Linear shape | Linear shape | Linear shape |
| Presence of second central narrow groove with both ends opening in adjacent center lug grooves | Absent | Present | Present |
| Presence of first central narrow groove with one end closed | Absent | Absent | Present |
| D1/D2 | — | 0.3 | 0.3 |
| L11/L12 | — | — | 0.3 |
| L11/(N × L12) | — | — | 0.7 |
| L13/L11 | — | 1.2 | 1.7 |
| D3/T | 0.06 | 0.06 | 0.06 |
| Whether or not second central narrow groove has turning out portion in each half tread region | — | Absent | Absent |
| Dm/(Bd or L11) | — | — | 0.09 |
| L14/L15 | 1.3 | 1.3 | 1.3 |
| Pattern symmetry | Point asymmetrical | Point asymmetrical | Point asymmetrical |
| Uneven wear resistance | 100 | 100 | 103 |
| Heat build-up resistance | 100 | 102 | 104 |

As shown in Table 5, if a pair of circumferential main grooves were provided, a center lug groove with a linear shape was provided, a second central narrow groove where both ends open in adjacent center lug grooves was provided, and a first central narrow groove was provided where one end opens in either the circumferential main groove and center lug groove and another end closes (Example 101), both heat build-up resistance and uneven wear resistance were achieved. In contrast, if a first central narrow groove was not provided where one end opens in either a circumferential main groove or center lug groove and another end closes (Comparative Example 102), heat build-up resistance and uneven wear resistance did not improve to the extend that both heat build-up resistance and uneven wear resistance could be achieved.

TABLE 6

|  | Example 102 | Example 103 | Example 104 | Example 105 | Example 106 | Example 107 |
| --- | --- | --- | --- | --- | --- | --- |
| Presence of circumferential main grooves | Present | Present | Present | Present | Present | Present |
| Whether or not center lug groove has a linear shape | Linear shape | Linear shape | Linear shape | Linear shape | Linear shape | Linear shape |
| Presence of second central narrow groove with both ends opening in adjacent center lug grooves | Present | Present | Present | Present | Present | Present |
| Presence of first central narrow groove with one end closed | Present | Present | Present | Present | Present | Present |
| D1/D2 | 0.2 | 0.1 | 0.2 | 0.2 | 0.2 | 0.2 |
| L11/L12 | 0.3 | 0.3 | 0.5 | 0.65 | 0.8 | 1.0 |
| L11/(N × L12) | 0.7 | 0.7 | 0.7 | 0.7 | 0.7 | 0.7 |
| L13/L11 | 1.7 | 1.7 | 1.7 | 1.7 | 1.7 | 1.7 |
| D3/T | 0.06 | 0.06 | 0.06 | 0.06 | 0.06 | 0.06 |
| Whether or not second central narrow groove has turning out portion in each half tread region | Absent | Absent | Absent | Absent | Absent | Absent |
| Dm/(Bd or L11) | 0.09 | 0.09 | 0.09 | 0.09 | 0.09 | 0.09 |
| L14/L15 | 1.3 | 1.3 | 1.3 | 1.3 | 1.3 | 1.3 |
| Pattern symmetry | Point asymmetrical | Point asymmetrical | Point asymmetrical | Point asymmetrical | Point asymmetrical | Point asymmetrical |
| Uneven wear resistance | 106 | 104 | 106 | 108 | 106 | 105 |
| Heat build-up resistance | 106 | 104 | 108 | 112 | 109 | 110 |

As seen in Table 5 and Table 6, if the ratio D1/D2 was 0.05 to 0.2 (Examples 102, 103), uneven wear resistance improved, and at least heat build-up resistance was maintained, as compared to if D1/D2 exceeded 0.2 (Example 101).

Furthermore, as seen in Table 6, if the ratio L11/L12 was 0.4 to 0.9 (Examples 104 to 106), at least uneven wear resistance was maintained, and heat build-up resistance improved, as compared to if L11/L12 was lower than 0.4 (Example 102). Furthermore, uneven wear resistance improved as compared to if the ratio L11/L12 exceeded 0.9 (Example 107).

TABLE 7

|  | Example 108 | Example 109 | Example 1110 | Example 111 |
| --- | --- | --- | --- | --- |
| Presence of circumferential main grooves | Present | Present | Present | Present |
| Whether or not center lug groove has a linear shape | Linear shape | Linear shape | Linear shape | Linear shape |
| Presence of second central narrow groove with both ends opening in adjacent center lug grooves | Present | Present | Present | Present |
| Presence of first central narrow groove with one end closed | Present | Present | Present | Present |
| D1/D2 | 0.2 | 0.2 | 0.2 | 0.2 |
| L11/L12 | 0.65 | 0.65 | 0.65 | 0.65 |
| L11/(N × L12) | 0.9 | 2.0 | 2.9 | 3.3 |
| L13/L11 | 1.7 | 1.7 | 1.7 | 1.7 |
| D3/T | 0.06 | 0.06 | 0.06 | 0.06 |

TABLE 7-continued

|  | Example 108 | Example 109 | Example 1110 | Example 111 |
|---|---|---|---|---|
| Whether or not second central narrow groove has turning out portion in each half tread region | Absent | Absent | Absent | Absent |
| Dm/(Bd or L11) | 0.09 | 0.09 | 0.09 | 0.09 |
| L14/L15 | 1.3 | 1.3 | 1.3 | 1.3 |
| Pattern symmetry | Point asymmetrical | Point asymmetrical | Point asymmetrical | Point asymmetrical |
| Uneven wear resistance | 109 | 109 | 108 | 106 |
| Heat build-up resistance | 115 | 119 | 116 | 116 |

As seen in Table 6 and Table 7, if the ratio L11/(N×L12) was 0.8 to 3.0 (Examples 108 to 110), at least uneven wear resistance was maintained, and heat build-up resistance improved, as compared to if L11/(N×L12) was lower than 0.8 (Example 105). Furthermore, uneven wear resistance improved as compared to if the ratio L11/(N×L12) exceeded 3.0 (Example 111).

TABLE 8

|  | Example 112 | Example 113 | Example 114 | Example 115 |
|---|---|---|---|---|
| Presence of circumferential main grooves | Present | Present | Present | Present |
| Whether or not center lug groove has a linear shape | Linear shape | Linear shape | Linear shape | Linear shape |
| Presence of second central narrow groove with both ends opening in adjacent center lug grooves | Present | Present | Present | Present |
| Presence of first central narrow groove with one end closed | Present | Present | Present | Present |
| D1/D2 | 0.2 | 0.2 | 0.2 | 0.2 |
| L11/L12 | 0.65 | 0.65 | 0.65 | 0.65 |
| L11/(N × L12) | 2.0 | 2.0 | 2.0 | 2.0 |
| L13/L11 | 1.8 | 2.0 | 2.2 | 2.3 |
| D3/T | 0.06 | 0.06 | 0.06 | 0.06 |
| Whether or not second central narrow groove has turning out portion in each half tread region | Absent | Absent | Absent | Absent |
| Dm/(Bd or L11) | 0.09 | 0.09 | 0.09 | 0.09 |
| L14/L15 | 1.3 | 1.3 | 1.3 | 1.3 |
| Pattern symmetry | Point asymmetrical | Point asymmetrical | Point asymmetrical | Point asymmetrical |
| Uneven wear resistance | 112 | 114 | 112 | 109 |
| Heat build-up resistance | 122 | 122 | 122 | 122 |

As seen in Table 7 and Table 8, if the ratio L13/L11 was 1.8 to 2.2 (Examples 112 to 114), heat build-up resistance and uneven wear resistance both improved as compared to if L3/L11 was lower than 1.8 (Example 109). Furthermore, uneven wear resistance improved and heat resistance was maintained, as compared to if the ratio L13/L11 exceeded 2.2 (Example 115).

TABLE 9

|  | Example 116 | Example 117 | Example 118 | Example 119 |
|---|---|---|---|---|
| Presence of circumferential main grooves | Present | Present | Present | Present |
| Whether or not center lug groove has a linear shape | Linear shape | Linear shape | Linear shape | Linear shape |
| Presence of second central narrow groove with both ends opening in adjacent center lug grooves | Present | Present | Present | Present |
| Presence of first central narrow groove with one end closed | Present | Present | Present | Present |
| D1/D2 | 0.2 | 0.2 | 0.2 | 0.2 |
| L11/L12 | 0.65 | 0.65 | 0.65 | 0.65 |

TABLE 9-continued

|  | Example 116 | Example 117 | Example 118 | Example 119 |
|---|---|---|---|---|
| L11/(N × L12) | 2.0 | 2.0 | 2.0 | 2.0 |
| L13/L11 | 2.0 | 2.0 | 2.0 | 2.0 |
| D3/T | 0.04 | 0.01 | 0.04 | 0.04 |
| Whether or not second central narrow groove has turning out portion in each half tread region | Absent | Absent | Present | Present |
| Dm/(Bd or L11) | 0.09 | 0.09 | 0.09 | 0.15 |
| L14/L15 | 1.3 | 1.3 | 1.3 | 1.3 |
| Pattern symmetry | Point asymmetrical | Point asymmetrical | Point asymmetrical | Point asymmetrical |
| Uneven wear resistance | 116 | 116 | 119 | 122 |
| Heat build-up resistance | 124 | 122 | 127 | 127 |

As seen in Table 8 and Table 9, if the ratio D3/T was 0.01 to 0.0.5 (Examples 116, 117), uneven wear resistance improved, and at least heat build-up resistance was maintained, as compared to if D3/T exceeded 0.05 (Example 113).

Furthermore, as seen in Table 9, if a second central narrow groove had a turning out portion in half tread regions (Example 118), heat build-up resistance and uneven wear resistance both improved, as compared to if the second central narrow groove did not have a turning out portion in half tread regions (Example 116). Note that an embodiment having a turning out portion in only one half tread region was used as an embodiment that does not have an turning out portion in the half tread regions.

If the ratio Dm/(Bd or L11) was 0.1 or higher (Example 119), uneven wear resistance improved as compared to if the ratio Dm/(Bd or L11) was lower than 0.1 (Example 118). Note that in Examples 118 and 119, Bd was shorter than L11, and thus ratio Dm/L11 was used as the ratio Dm/(Bd or L11).

TABLE 10

|  | Example 120 | Example 121 | Example 122 | Example 123 | Example 124 |
|---|---|---|---|---|---|
| Presence of circumferential main grooves | Present | Present | Present | Present | Present |
| Whether or not center lug groove has a linear shape | Linear shape | Linear shape | Linear shape | Linear shape | Linear shape |
| Presence of second central narrow groove with both ends opening in adjacent center lug grooves | Present | Present | Present | Present | Present |
| Presence of first central narrow groove with one end closed | Present | Present | Present | Present | Present |
| D1/D2 | 0.2 | 0.2 | 0.2 | 0.2 | 0.2 |
| L11/L12 | 0.65 | 0.65 | 0.65 | 0.65 | 0.65 |
| L11/(N × L12) | 2.0 | 2.0 | 2.0 | 2.0 | 2.0 |
| L13/L11 | 2.0 | 2.0 | 2.0 | 2.0 | 2.0 |
| D3/T | 0.4 | 0.04 | 0.04 | 0.04 | 0.04 |
| Whether or not second central narrow groove has turning out portion in each half tread region | Present | Present | Present | Present | Present |
| Dm/(Bd or L11) | 0.15 | 0.15 | 0.15 | 0.15 | 0.15 |
| L14/L15 | 0.9 | 1.0 | 1.1 | 1.4 | 1.0 |
| Pattern symmetry | Point asymmetrical | Point asymmetrical | Point asymmetrical | Point asymmetrical | Point symmetrical |
| Uneven wear resistance | 122 | 124 | 124 | 120 | 126 |
| Heat build-up resistance | 130 | 132 | 133 | 128 | 134 |

As seen in Table 10, if the ratio L14/L15 was 1.0 to 1.2 (Examples 121 to 122), heat build-up resistance and uneven wear resistance both improved as compared if the ratio L14/L15 was lower than 1.0 (Example 120), and the ratio L14/L15 exceeded 1.2 (Example 123).

Furthermore, if the tread pattern 10 was point symmetrical (Example 124), heat build-up resistance and uneven wear resistance both improved as compared to if the tread pattern was not point symmetrical (Example 122). Note that an embodiment where the patterns in both half tread regions are mutually different was used as an embodiment where the tread pattern was not point symmetrical.

The foregoing has been a detailed description of the heavy duty pneumatic tire of the present technology. However, the present technology is not limited to the aforementioned Embodiments and Examples, and may be improved or modified in various ways within a scope that does depart from the gist of the present technology.

The invention claimed is:

1. A heavy duty pneumatic tire with a tread pattern, the tread pattern comprising:
    a plurality of center lug grooves with a linear shape, provided at intervals in a tire circumferential direction, each having both ends, and each extending in an inclined direction with respect to a tire lateral direction and tire circumferential direction, in half tread regions that are on a first side and a second side of a tire equator line in a tire lateral direction so as to cross the tire equator line;
    a plurality of shoulder lug grooves provided at intervals in a tire circumferential direction in the half tread regions, extending outward in a tire lateral direction, and opening to a ground contact end that is on either side in a tire lateral direction, positions in the tire lateral direction of inward ends of the shoulder lug grooves being further outward than positions in the tire lateral direction of ends of the center lug grooves, and one of the shoulder lug grooves being provided between adjacent center lug grooves adjacent in a tire circumferential direction of the center lug grooves in a tire circumferential direction;
    a pair of circumferential main grooves provided in the half tread regions, each formed in a wave shape over an entire region along the tire circumferential direction, each including a first groove turning portion curved or bent to form a convex shape outward in the tire lateral direction, and a second groove turning portion curved or bent to form a convex shape inward in the tire lateral direction, such that each of the circumferential main grooves alternately connects one of the ends of the center lug grooves and one of the inward ends of the shoulder lug grooves;
    a plurality of center blocks formed in a row in the tire circumferential direction, each demarcated by the adjacent center lug grooves and the pair of circumferential main grooves; and
    a central narrow groove having a non-linear shape, extending in a region of one of the center blocks, and having opening ends that open at the adjacent center lug grooves at positions in the tire lateral direction away from the tire equator line, and having a groove width narrower than a groove width of the shoulder lug grooves; wherein
    a groove width of the center lug grooves and a groove width of the circumferential main grooves are narrower than the groove width of the shoulder lug grooves,
    the central narrow groove has portions each extending outward in the tire lateral direction from one of the opening ends, in one of the half tread regions where the one of the opening ends is positioned,
    a ratio L1/L2 exceeds 1.8 and is not greater than 2.2, in which a length of the central narrow groove is L1, and a tire circumferential direction length of each of the center blocks is L2, and
    the opening ends open to the center lug grooves closer to the tire equator line than a connection of the ends of the center lug grooves to the circumferential main grooves, and a groove wall of the center lug grooves is opposite the opening ends.

2. The heavy duty pneumatic tire according to claim 1, wherein a maximum groove depth of the circumferential main grooves is shallower than a maximum groove depth of the center lug grooves, and the maximum groove depth of the center lug grooves is shallower than a maximum depth of the shoulder lug grooves.

3. The heavy duty pneumatic tire according to claim 1, wherein a ratio D1/D2 is 0.05 to 0.2, in which a maximum groove depth of the central narrow groove is D1, and a maximum depth of the circumferential main grooves is D2.

4. The heavy duty pneumatic tire according to claim 1, wherein the tread pattern is point symmetrical with respect to a center point on a tread surface of one of the center blocks.

5. The heavy-duty pneumatic tire according to claim 1, wherein a groove width of the circumferential main grooves and a groove width of the center lug grooves are both 7 to 20 mm.

6. The heavy duty pneumatic tire according to claim 1, wherein the heavy duty pneumatic tire is mounted on a construction vehicle or an industrial vehicle.

7. The heavy duty pneumatic tire according to claim 1, further comprising:
    a raised bottom portion formed by partially making a groove depth shallower in each of the pair of circumferential main grooves.

8. The heavy duty pneumatic tire according to claim 7, wherein a ratio D3/T is 0.01 to 0.05, in which a shallowest groove depth in the raised bottom portion is D3, and a tread width in a tire lateral direction of a tread portion on which the tread pattern is formed is T.

9. The heavy duty pneumatic tire according to claim 1, wherein the central narrow groove has two turning out portions, each extending so as to protrude outward in the tire lateral direction with respect to the tire equator line in each of the half tread regions.

10. The heavy duty pneumatic tire according to claim 9, wherein Lb is longer than La, in which a length of a portion of the central narrow groove extending from one of the opening ends to an apex portion of one of the turning out portions is La, and a length of a portion of the central narrow groove extending between apex portions of the turning out portions is Lb.

11. The heavy duty pneumatic tire according to claim 10, wherein the opening ends of the central narrow groove open inclined towards the tire equator line.

12. The heavy duty pneumatic tire according to claim 1, the tread pattern further comprising:
    a plurality of shoulder blocks formed in a row in a tire circumferential direction, each demarcated by an end in a tire lateral direction of a tread portion on which the tread pattern is formed, the circumferential main groove, and a pair of adjacent shoulder lug grooves adjacent in the tire circumferential direction of the shoulder lug grooves, in each of the half tread regions; and shoulder narrow grooves each extending in a region of one of the shoulder blocks, opening to the adjacent shoulder lug grooves, and having a groove width narrower than the groove width of the shoulder lug grooves.

13. The heavy duty pneumatic tire according to claim 12, wherein a ratio L3/L4 is 1.0 to 1.4, in which a length of each of the shoulder narrow grooves is L3, and a minimum length in a tire circumferential direction of the shoulder blocks is L4.

14. The heavy duty pneumatic tire according to claim 12, wherein the shoulder narrow grooves have a smaller groove width than the central narrow groove.

15. The heavy duty pneumatic tire according to claim 12, wherein the shoulder narrow grooves have a non-linear shape.

\* \* \* \* \*